United States Patent
Awazu et al.

(10) Patent No.: US 10,928,644 B2
(45) Date of Patent: Feb. 23, 2021

(54) ANTI-VIBRATION DEVICE AND BINOCLE

(71) Applicant: FUJIFILM Corporation, Tokyo (JP)

(72) Inventors: Kouhei Awazu, Saitama (JP); Akimasa Kaya, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 272 days.

(21) Appl. No.: 16/110,149

(22) Filed: Aug. 23, 2018

(65) Prior Publication Data
US 2018/0364495 A1    Dec. 20, 2018

Related U.S. Application Data

(63) Continuation of application No. PCT/JP2017/006202, filed on Feb. 20, 2017.

(30) Foreign Application Priority Data

Feb. 24, 2016 (JP) .............................. JP2016-033396

(51) Int. Cl.
*G02B 27/64* (2006.01)
*G02B 23/18* (2006.01)
(Continued)

(52) U.S. Cl.
CPC .......... *G02B 27/646* (2013.01); *G02B 23/02* (2013.01); *G02B 23/18* (2013.01); *H02K 11/215* (2016.01); *H02K 41/0356* (2013.01)

(58) Field of Classification Search
CPC ...... G02B 27/646; G02B 23/00; G02B 23/02; G02B 23/18; H02K 11/215; H02K 41/0356
(Continued)

(56) References Cited

U.S. PATENT DOCUMENTS

2012/0194904 A1    8/2012 Noguchi
2013/0155262 A1    6/2013 Katoh et al.
(Continued)

FOREIGN PATENT DOCUMENTS

JP    10-319459 A    12/1998
JP    10-333201 A    12/1998
(Continued)

OTHER PUBLICATIONS

International Preliminary Report on Patentability (Form PCT/IPEA/409) for International Application No. PCT/JP2017/006202, dated May 15, 2018, with English translation.
(Continued)

*Primary Examiner* — Jade R Chwasz
(74) *Attorney, Agent, or Firm* — Birch, Stewart, Kolasch & Birch, LLP

(57) ABSTRACT

In a case where a first coil enters an energized state, the first coil, a second coil, a detection magnet, and a Z-axis position sensor move in an X axis direction. In a case where the second coil enters an energized state, the second coil and the detection magnet move in a Z axis direction, but the first coil and the Z-axis position sensor do not move in the Z axis direction. The Z-axis position sensor is disposed so as to be spaced from the second coil, and the detection magnet is disposed on a side opposite to a second driving magnet with respect to the Z-axis position sensor. The Z-axis position sensor detects a displacement amount V of the detection magnet in the Z axis direction.

7 Claims, 16 Drawing Sheets

(51) Int. Cl.
*H02K 11/215* (2016.01)
*G02B 23/02* (2006.01)
*H02K 41/035* (2006.01)

(58) Field of Classification Search
USPC .................................................. 359/407, 480
See application file for complete search history.

(56) References Cited

U.S. PATENT DOCUMENTS

| 2015/0219920 | A1 | 8/2015 | Ando et al. | |
|---|---|---|---|---|
| 2018/0299690 | A1* | 10/2018 | Kaya ...................... | G02B 23/02 |
| 2018/0299691 | A1* | 10/2018 | Awazu .................... | G02B 23/18 |
| 2018/0364443 | A1* | 12/2018 | Awazu .................... | G02B 7/06 |

FOREIGN PATENT DOCUMENTS

| JP | 2009-24449 A | 10/2009 |
|---|---|---|
| JP | 2012-159748 A | 8/2012 |
| JP | 2013-126075 A | 6/2013 |
| JP | 2015-143728 A | 8/2015 |

OTHER PUBLICATIONS

International Search Report and Written Opinion of the International Searching Authority (Forms PCT/ISA/210 and PCT/ISA/237) for International Application No. PCT/JP2017/006202, dated May 9, 2017, with English translation of the Search Report.

* cited by examiner

ANTI-VIBRATION DEVICE AND BINOCLE

CROSS-REFERENCE TO RELATED APPLICATIONS

This application is a Continuation of PCT International Application No. PCT/JP2017/006202 filed on 20 Feb. 2017, which claims priority under 35 U.S.C § 119(a) to Japanese Patent Application No. 2016-033396 filed on 24 Feb. 2016. The above application is hereby expressly incorporated by reference, in its entirety, into the present application.

BACKGROUND OF THE INVENTION

1. Field of the Invention

The present invention relates to an anti-vibration device which is driven in a biaxial direction, and a binocle.

2. Description of the Related Art

As an optical observation device for observing an optical image of a distant view in an enlarged manner, there are binocles each having a pair of telephoto optical systems disposed in a left-right direction. Further, in order to prevent image blurring of an optical image from being caused by vibration such as hand shaking, optical observation devices each comprising an anti-vibration device that corrects image blurring of the optical image have been known.

JP2015-143728A (corresponding to US2015/219920A1) describes a binocle including an anti-vibration device that corrects image blurring in a pitch direction and a yaw direction by respectively rotating a pair of erecting prisms around two perpendicular rotational axes. This binocle includes a middle frame which is rotatably attached to a casing, a pair of inner frames which is rotatably attached around an axis perpendicular to the middle frame and to which the erecting prisms are respectively fixed, three voice coil motors for respectively rotating the middle frame and the pair of inner frames, position detection elements (magnetic sensors), and a controller that controls driving of the voice coil motors. The voice coil motor is constituted by permanent magnets respectively buried in the inner frames and the middle frame, and hollow coils disposed so as to face the permanent magnets. The position detection elements are disposed within the coils. In a case where current flows to the coils, the permanent magnets move, and thus, the inner frames and the middle frame are respectively rotated around the rotational axes.

In the binocle described in JP2015-143728A, the position detection elements disposed within the coils output position detection signals for detecting positions of the coils with respect to the permanent magnets. The controller can correct image blurring in the pitch direction and the yaw direction by rotating the erecting prisms in a direction in which the image blurring is cancelled based on the position detection signals from the position detection elements.

SUMMARY OF THE INVENTION

The anti-vibration device is built into the optical observation device such as the binocle, and therefore it is preferable that the anti-vibration device has a small size and a light weight in order to secure a storage space, increase a response speed, and improve portability. However, in the anti-vibration device described in JP2015-143728A, since the casing becomes large since the middle frame and the pair of inner frames are disposed between the casing and the erecting prisms and three voice coil motors for driving the middle frame and the pair of inner frames are needed, it is difficult to reduce the weight and size of the anti-vibration device.

Thus, the present inventor has developed an anti-vibration device using first and second reflective members instead of the erecting prisms. This anti-vibration device performs anti-vibration in a pitch direction by fixing one reflective member of the first reflective member and the second reflective member and rotating the other reflective member and performs anti-vibration in a yaw direction by disposing a pair of left and right holding members which holds the first reflective member and the second reflective member and rotating the holding members.

The present inventor has examined a configuration of the anti-vibration device including a first link member that is pin-coupled to the pair of holding members, a second link member that is attached to the first link member so as to be rotatable around third rotational axes parallel to second rotational axes and has abutment portions which rotate the other reflective member by engaging with the other reflective member, and a drive unit that moves the first link member and the second link member in order to rotate the pair of holding members around first rotational axes so as to perform the anti-vibration in the yaw direction and rotate the reflective members held by the holding members around the second rotational axes so as to perform the anti-vibration in the pitch direction. The drive unit that drives the anti-vibration device includes a first voice coil motor which moves the first link member in an arrangement direction of the holding members, and a second voice coil motor which rotates the second link member around the third rotational axes. The coil of the first voice coil motor is fixed to the first link member, and the coil of the second voice coil motor is fixed to the second link member. Accordingly, it is possible to perform the anti-vibration in the yaw direction and the pitch direction by using only the two voice coil motors, and it is possible to further reduce the weights and sizes of the anti-vibration device and the binocle.

However, it is possible to reduce the sizes and weights of the anti-vibration device and the binocle by using such a drive unit, but the coil of the second voice coil motor also moves together with the first link member by the driving of the first voice coil motor in order to rotatably attach the second link member to the first link member. Thus, as in JP2015-143728A, in a case where the magnetic sensor is provided within the hollow coil, there is a problem that the position detection signal for detecting the position of the second voice coil motor varies by the driving of the first voice coil motor. Thus, a structure of the drive unit capable of accurately detecting the position of the voice coil motor is needed.

In order to solve the problem, an object of the present invention is to provide an anti-vibration device capable of improving position detection accuracy of a magnetic sensor in driving in a biaxial direction, and a binocle.

In order to achieve the object, an anti-vibration device of the present invention comprises a drive unit, a first reflective member, a second reflective member, holding members, and a link mechanism. The drive unit comprises a first voice coil motor, a second voice coil motor, a position detection magnet, and a magnetic sensor. The position detection magnet is positioned on a side opposite to a second driving magnet with respect to the magnetic sensor in a first direction. The first voice coil motor has a first driving magnet, and a first coil which is provided within a magnetic field generated by the first driving magnet and is driven in the first direction in a case where the first coil is energized. The second voice coil motor has the second driving magnet, and a second coil which is provided within a magnetic field generated by the second driving magnet and is driven in a second direction perpendicular to the first direction in a case where the second coil is energized. The position detection magnet moves integrally with the second coil. The magnetic sensor is disposed so as to be spaced from the second coil in the first direction, and detects a displacement amount of the position detection magnet in the second direction. The first reflective member is disposed to be inclined with respect to first optical axes and forms second optical axes by deflecting the first optical axes. The second reflective member is disposed to be inclined with respect to the second optical axes and forms third optical axes parallel to the first optical axes by deflecting the second optical axes. The holding members hold the first reflective member and the second reflective member, and are disposed so as to be rotatable around first rotational axes which are present on a plane including the first optical axes and the second optical axes and cross the first optical axes or the third optical axes. The holding members fixedly hold one reflective member of the first reflective member and the second reflective member, and rotatably hold the other reflective member around second rotational axes perpendicular to the plane including the first optical axes and the second optical axes. The link mechanism rotates a pair of the holding members disposed in a state in which the first optical axes are held in parallel with each other around the first rotational axes and rotates the other reflective member of the first reflective member and the second reflective member around the second rotational axis. The link mechanism includes a first link member that has pin coupling portions which are pin-coupled to the pair of holding members, and a second link member that is attached to the first link member so as to be rotatable around third rotational axes parallel to the second rotational axes and has abutment portions which rotate the other reflective member by engaging with the other reflective member. The first voice coil motor moves the first link member in the first direction which is an arrangement direction of the holding members, and the second voice coil motor rotates the second link member around the third rotational axes by moving the second link member in the second direction.

It is preferable that the magnetic sensor is a Hall element which detects a magnetic field generated by the position detection magnet.

It is preferable that the first coil is attached to the first link member and the second coil and the position detection magnet are attached to the second link member.

It is preferable that the magnetic sensor is fixed to the first link member through a holding piece and the holding piece holds the magnetic sensor with a predetermined distance from the position detection magnet in the first direction. It is preferable that the predetermined distance between the position detection magnet and the magnetic sensor is 50% to 200% of a movement stroke of the position detection magnet in the first direction.

A binocle of the present invention comprises objective optical systems each having a positive composite focal length, ocular optical systems, and the anti-vibration device provided between the objective optical systems and the ocular optical systems. It is preferable that the ocular optical systems each have a positive composite focal length and erecting optical systems that invert an optical image in vertical and horizontal directions are provided between the anti-vibration device and the ocular optical systems.

According to the present invention, it is possible to provide an anti-vibration device capable of improving position detection accuracy of a magnetic sensor in driving in a biaxial direction, and a binocle.

DESCRIPTION OF THE PREFERRED EMBODIMENTS

Figure 1:
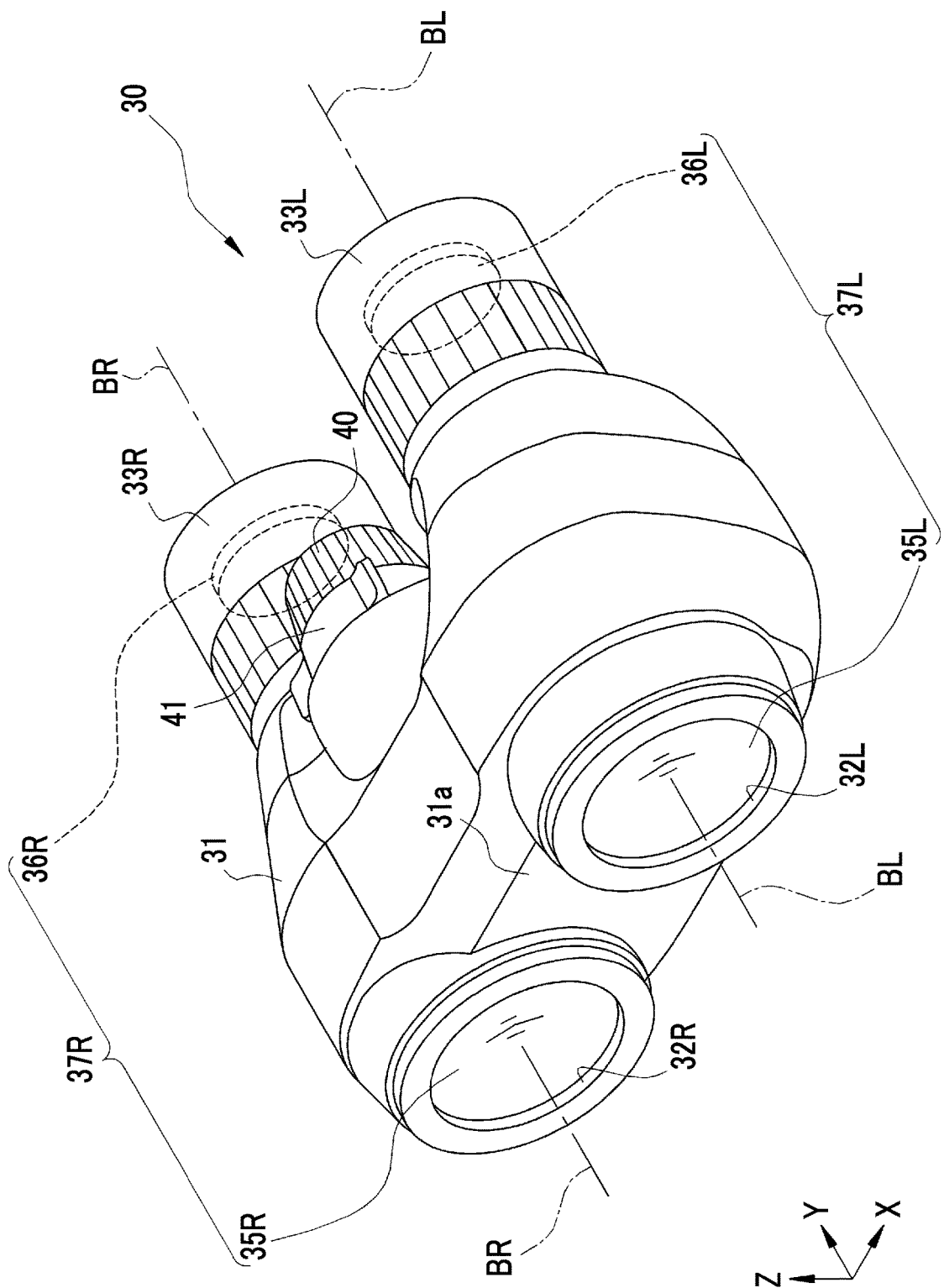
FIG. 1 is a perspective view illustrating an appearance of a binocle.

As shown in FIG. 1, a binocle 30 of the present embodiment is an optical observation device that is used to observe an optical image of a distant view in an enlarged manner through a pair of left telephoto optical system 37L and right telephoto optical system 37R which are constituted by telephoto optical systems. An anti-vibration device 45 to be described below is provided on the binocle 30. Assuming that a front-back direction of the binocle 30 is a Y axis, a width direction orthogonal to the front-back direction is an X axis, and a vertical axis perpendicular to the Y axis and the X axis is a Z axis, the anti-vibration device 45 corrects image blurring in a pitch direction around the X axis and image blurring in a yaw direction around the Z axis.

The binocle 30 includes a main body portion 31, and a pair of left eyepiece portion 33L and right eyepiece portion 33R. A pair of left objective opening 32L and right objective opening 32R is provided on a front surface 31a of the main body portion 31. The left eyepiece portion 33L and the right eyepiece portion 33R are provided on a rear side of the main body portion 31. Through the binocle 30, an enlarged image of an observation target can be observed by orienting the left objective opening 32L and the right objective opening 32R toward the observation target and viewing the observation target through the left eyepiece portion 33L and the right eyepiece portion 33R with both eyes in a state where the main body portion 31 is gripped.

Inside the left objective opening 32L and the right objective opening 32R, a left objective optical system 35L and a right objective optical system 35R are provided. The left objective optical system 35L and the right objective optical system 35R are disposed such that a pair of left and right optical axes thereof is in parallel with each other.

Inside the left eyepiece portion 33L and the right eyepiece portion 33R, a left ocular optical system 36L and a right ocular optical system 36R are provided. The left ocular optical system 36L and the right ocular optical system 36R are disposed such that a pair of left and right optical axes thereof is in parallel with each other. The left objective optical system 35L, the right objective optical system 35R, the left ocular optical system 36L, and the right ocular optical system 36R each are composed of a lens having a positive composite focal length.

The left objective optical system 35L and the left ocular optical system 36L are disposed on a left-eye optical axis BL which is set along the front-back direction (Y axis direction) of the binocle 30, and constitute the left telephoto optical system 37L. Further, the right objective optical system 35R and the right ocular optical system 36R are disposed on a right-eye optical axis BR which is set in parallel to the left-eye optical axis BL in the width direction (X axis direction) orthogonal to the front-back direction of the binocle 30, and constitute the right telephoto optical system 37R. Hereinafter, it is assumed that an objective side is referred to as a front side or a front end and an ocular side is referred to a rear side or a rear end in the Y axis direction.

A battery housing 39 is provided within the main body portion 31. The battery housing 39 houses a battery 42 (see FIG. 2) that serves as a power supply of a first voice coil motor 56, a second voice coil motor 57 (see FIG. 4), and an anti-vibration control circuit 91 (see FIG. 14) to be described below. The battery 42 has a square plate shape. Further, an adjusting knob 40, which is rotated in a case where focus adjustment is performed, is provided on an upper portion on the rear side of the main body portion 31. A rotation type power switch 41 is provided coaxially with the adjusting knob 40. The power switch 41 is rotated, and thus, the anti-vibration control circuit 91 is actuated.

Figure 2:
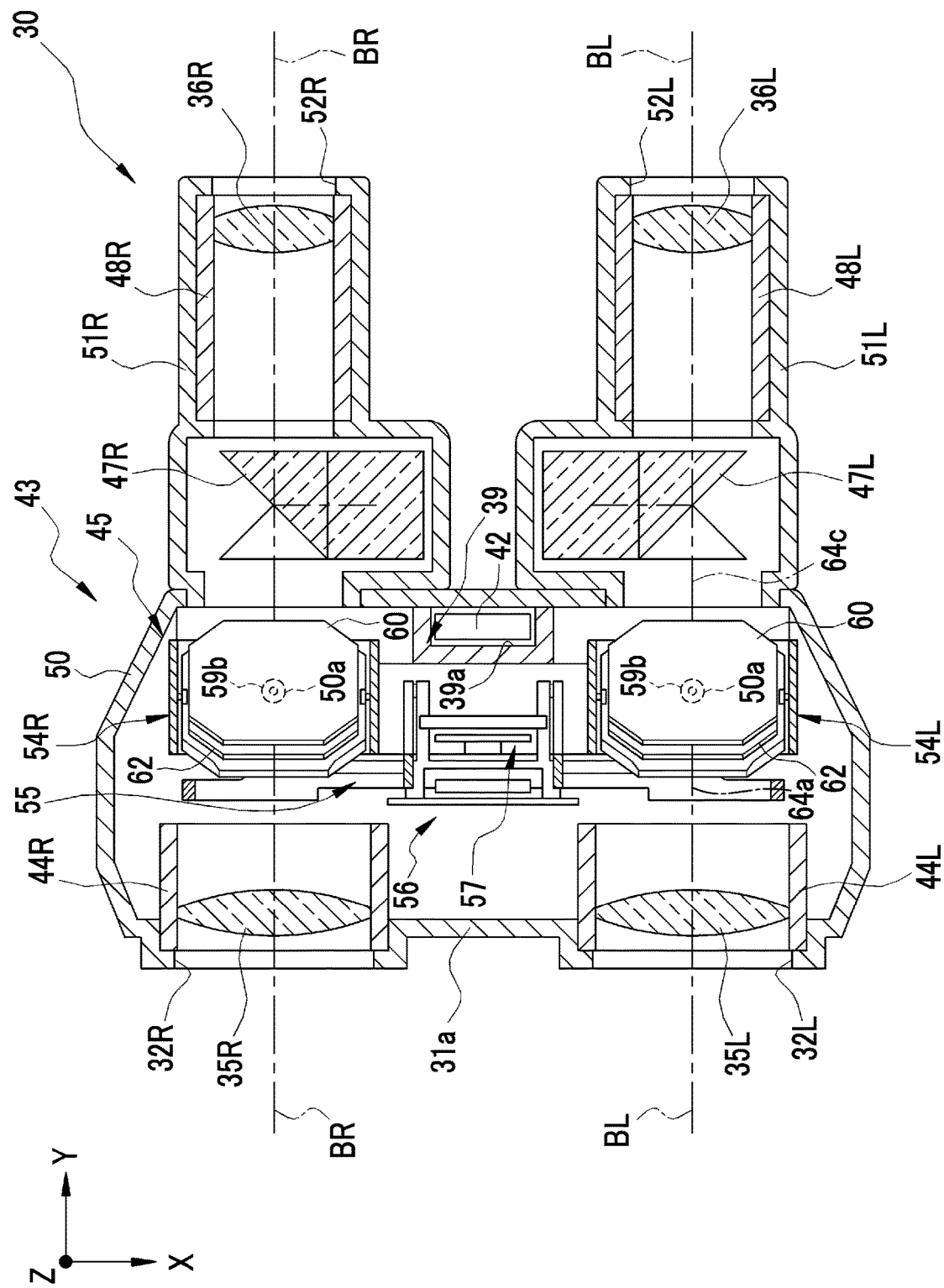
FIG. 2 is a horizontal cross section view of the binocle.
Figure 3:
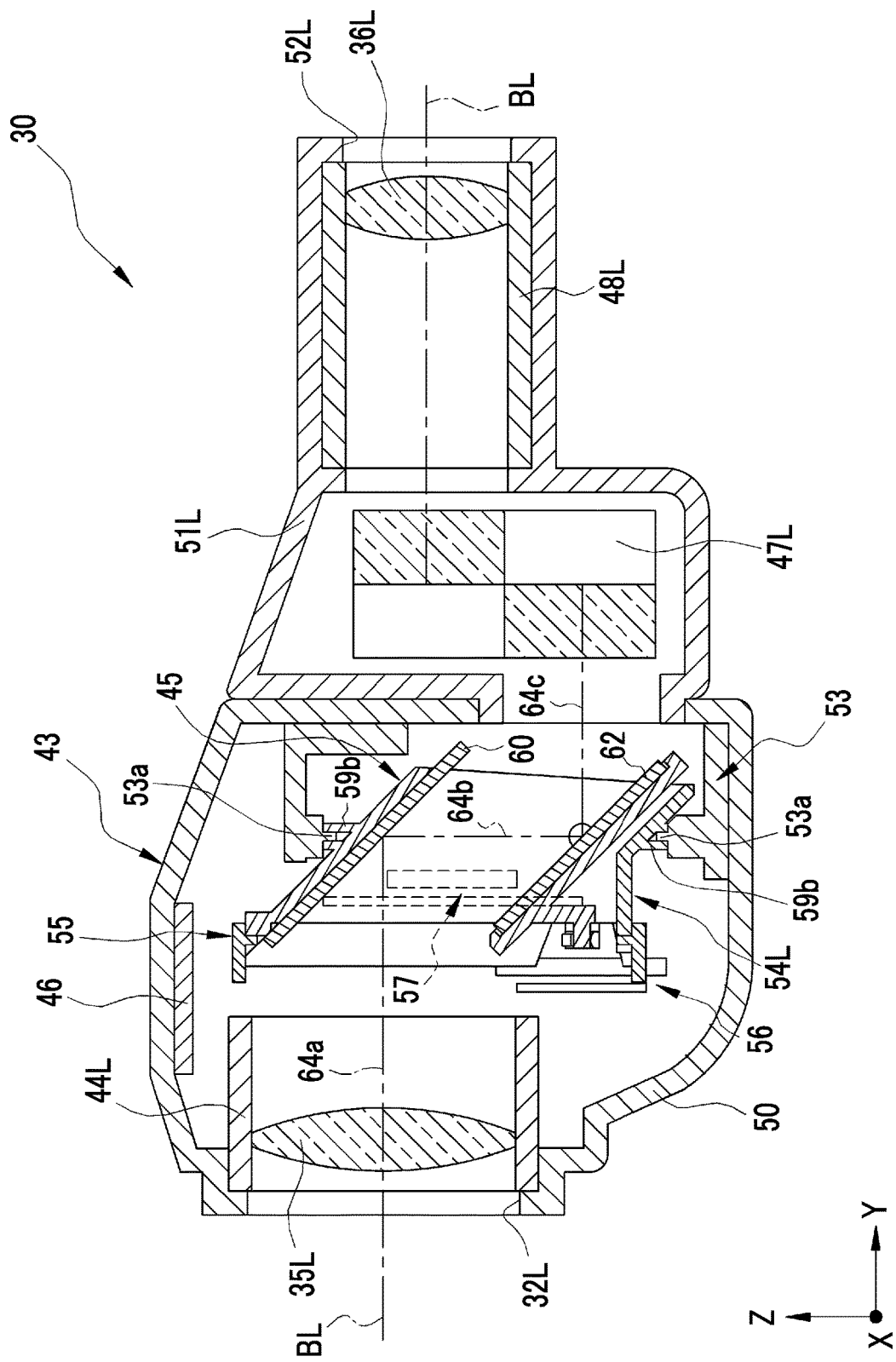
FIG. 3 is a vertical cross section view taken along a left-eye optical axis of the binocle.

FIG. 2 shows a horizontal cross section of the binocle 30, and FIG. 3 shows a vertical cross section taken along the left-eye optical axis BL. As shown in FIGS. 2 and 3, the binocle 30 comprises a casing 43, a left objective barrel 44L, a right objective barrel 44R, an anti-vibration device 45, a control substrate 46, a left erecting optical system 47L, a right erecting optical system 47R, a left eyepiece barrel 48L, and a right eyepiece barrel 48R. The anti-vibration device 45 including an anti-vibration optical system, the left erecting optical system 47L, and the right erecting optical system 47R constitute the left telephoto optical system 37L and the right telephoto optical system 37R.

The casing 43 comprises a casing main body 50, a left eyepiece casing 51L, and a right eyepiece casing 51R. The casing main body 50 is an exterior of the main body portion 31. The left eyepiece casing 51L is an exterior of the left eyepiece portion 33L. The right eyepiece casing 51R is an exterior of the right eyepiece portion 33R. The casing main body 50 houses the left objective barrel 44L, the right objective barrel 44R, the anti-vibration device 45, and the control substrate 46. The left eyepiece casing 51L houses the left erecting optical system 47L and the left eyepiece barrel 48L. Further, the right eyepiece casing 51R houses the right erecting optical system 47R and the right eyepiece barrel 48R. A support member 53 is fixed to the casing main body 50. The support member 53 vertically supports the anti-vibration device 45.

In the left eyepiece casing 51L and the right eyepiece casing 51R, a left eyepiece opening 52L and a right eyepiece opening 52R are respectively provided to expose the left ocular optical system 36L and the right ocular optical system 36R to the outside. Further, the left eyepiece casing 51L and the right eyepiece casing 51R are fit into the casing main body 50 so as to be rotatable respectively around the left-eye optical axis BL and the right-eye optical axis BR. Accordingly, it is possible to adjust the left ocular optical system 36L and the right ocular optical system 36R in accordance with spacing between both eyes of a binocle user.

The left objective barrel 44L and the right objective barrel 44R have cylinder shapes, and the left objective optical system 35L and the right objective optical system 35R are respectively housed therein. The left objective barrel 44L and the right objective barrel 44R are held movably in the optical axis direction through a holding mechanism which is not shown. The holding mechanism moves the left objective barrel 44L and the right objective barrel 44R in the optical axis direction through the rotation operation of the adjusting knob 40.

Figure 4:
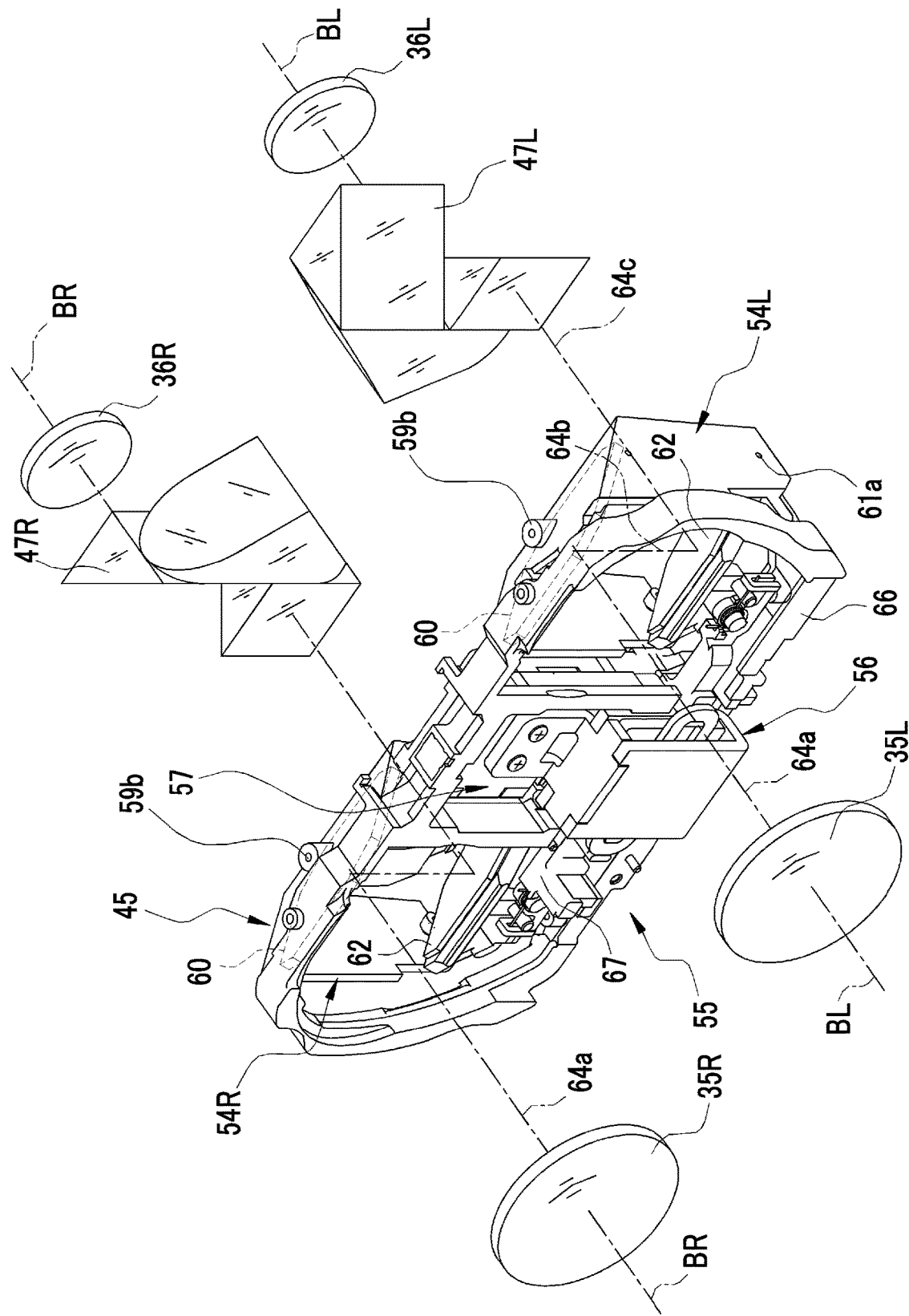
FIG. 4 is a perspective view illustrating a configuration of an anti-vibration device.

The anti-vibration device 45 is a device for correcting image blurring, which is caused by hand shaking and the like, on an optical image. The anti-vibration device 45 is disposed between the left and right objective optical systems 35L and 35R and the left and right ocular optical systems 36L and 36R. As shown in FIG. 4, the anti-vibration device 45 comprises a left anti-vibration unit 54L, a right anti-vibration unit 54R, a link mechanism 55, the first voice coil motor 56, and the second voice coil motor 57.

The left anti-vibration unit 54L is a mechanism for correcting image blurring in the left telephoto optical system 37L. The left anti-vibration unit 54L is disposed between the left objective optical system 35L and the left ocular optical system 36L, and constitutes a part of the left telephoto optical system 37L. Further, the right anti-vibration unit 54R is a mechanism for correcting image blurring in the right telephoto optical system 37R. The right anti-vibration unit 54R is disposed between the right objective optical system 35R and the right ocular optical system 36R, and constitutes a part of the right telephoto optical system 37R.

The link mechanism 55 is a mechanism that links the left anti-vibration unit 54L and the right anti-vibration unit 54R with each other and that causes the left anti-vibration unit 54L and the right anti-vibration unit 54R to perform the same operations at the time of image blur correction. The first voice coil motor 56 and the second voice coil motor 57 are disposed between the left anti-vibration unit 54L and the right anti-vibration unit 54R, and operate the left anti-vibration unit 54L and the right anti-vibration unit 54R by driving the link mechanism 55.

The left erecting optical system 47L and the right erecting optical system 47R are optical systems that invert the optical image, in which image blurring is corrected through the anti-vibration device 45, in vertical and horizontal directions, and that causes light to be incident into the left ocular optical system 36L and the right ocular optical system 36R. In each of the left erecting optical system 47L and the right erecting optical system 47R, an erecting prism such as a Porro prism or a roof prism is used.

The left eyepiece barrel 48L and the right eyepiece barrel 48R have cylinder shapes, and the left ocular optical system 36L and the right ocular optical system 36R are respectively housed therein. In addition, for the sake of simplicity of drawings, the left objective optical system 35L, the right objective optical system 35R, the left ocular optical system 36L, and the right ocular optical system 36R each are shown as a single lens, but may be composed of a plurality of lenses.

Figure 5:
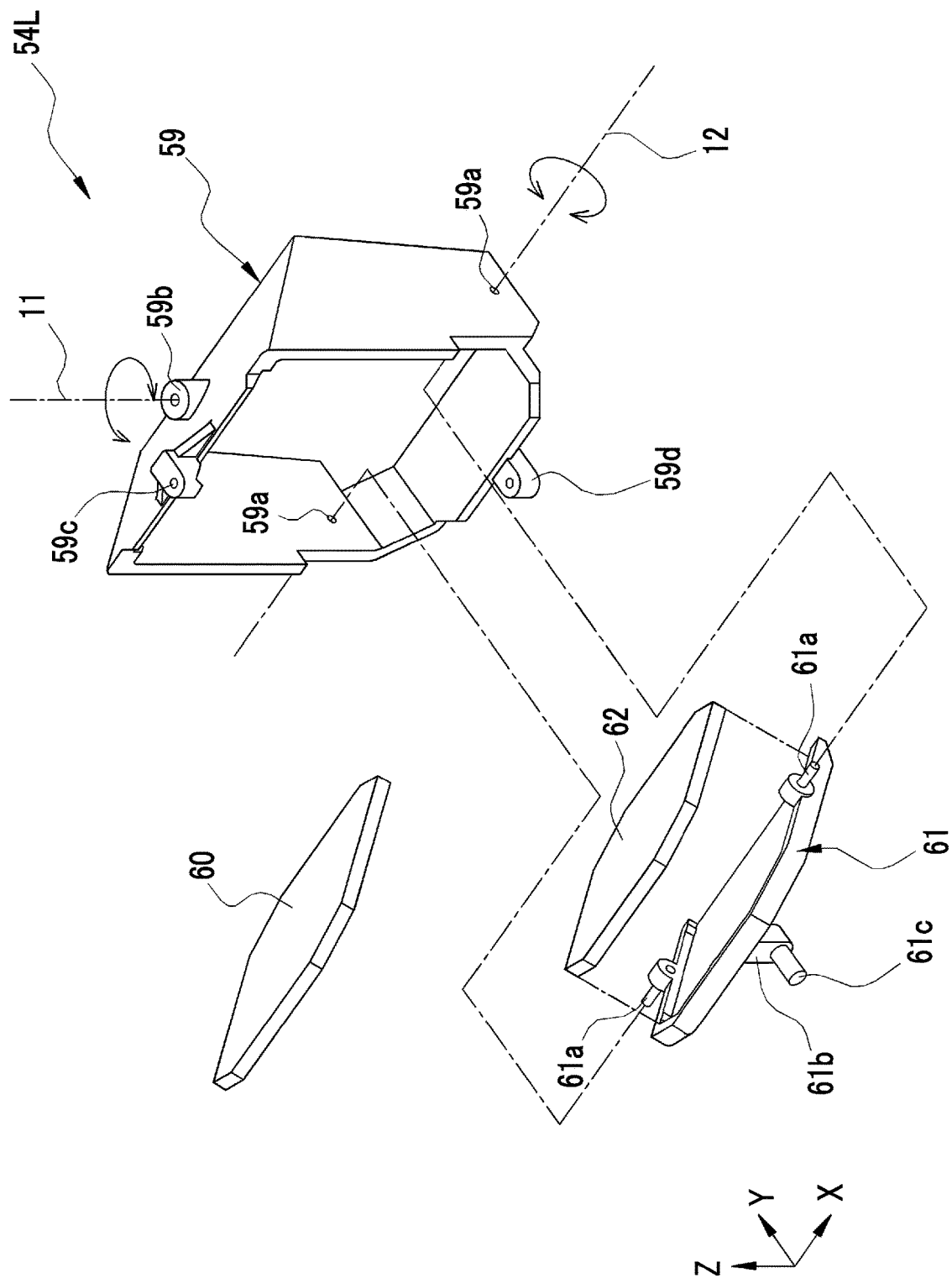
FIG. 5 is an exploded perspective view of a left anti-vibration unit including the anti-vibration optical system.

As shown in FIG. 5, the left anti-vibration unit 54L comprises a barrel 59, a first reflective member 60, a holding plate 61, and a second reflective member 62. The barrel 59 has a box shape of which a front side and a rear side are opened. The first reflective member 60 is fixed in the barrel 59. The holding plate 61 is rotatably supported in the barrel 59. The second reflective member 62 is fixed onto an upper surface of the holding plate 61. In each of the first reflective member 60 and the second reflective member 62, for example, a surface-reflection-type reflection mirror is used. The barrel 59 corresponds to a holding member of the present invention.

The first reflective member 60 is inserted in the barrel 59, and is fixed onto an upper surface of an inner wall of the barrel 59 through an adhesive or the like such that a reflective surface thereof is oriented downward. As shown in FIG. 3, the upper surface of the inner wall of the barrel 59 viewed from the X axis direction is inclined at an angle of 45° with respect to a first optical axis 64a which is an optical axis of the left objective optical system 35L. Accordingly, the first reflective member 60 is also held at an angle of 45° with respect to the first optical axis 64a.

Referring back to FIG. 5, the holding plate 61 is a rectangular-plate-like member. The second reflective member 62 is fixed onto the upper surface of the holding plate 61 through an adhesive or the like such that the reflective surface thereof is oriented upward. A pair of rotation pins 61a is provided on both side surfaces of the holding plate 61. The pair of rotation pins 61a is inserted into a pair of bearing holes 59a which is formed in both side surfaces of the barrel 59 in a case where the holding plate 61 is inserted into the barrel 59. Thereby, the holding plate 61 and the second reflective member 62 are rotatably held in the barrel 59. The pair of rotation pins 61a supported by the pair of bearing holes 59a constitutes a second rotational axis 12 of the present invention.

A bracket 61b, which protrudes downward, is provided on a lower surface of the holding plate 61. A connecting pin 61c, which protrudes in the Y axis direction, is provided on a distal end of the bracket 61b. The holding plate 61 is rotated by the link mechanism 55 with the connecting pin 61c interposed therebetween. In addition, in a state (neutral state: states of FIGS. 4 and 9) in which vibration does not occur on the binocle 30, an angle of the holding plate 61 is held by the link mechanism 55 such that the second reflective member 62 is parallel to the first reflective member 60.

As shown in FIGS. 3 and 5, a pair of bearing bosses 59b is provided on the same Z axis of an upper surface and a lower surface of the barrel 59. The bearing bosses 59b are rotatably supported by a pair of bearing pins 53a (see FIG. 3) vertically provided on an upper surface and a lower surface of an inner wall of the support member 53 (see FIG. 3). Thereby, the first reflective member 60 and second reflective member 62 held by the barrel 59 are integrally rotatable around the Z axis. The bearing pins 53a supported by the pair of bearing bosses 59b function as a first rotational axis 11 of the present invention. Further, a pair of upper connection boss 59c and lower connection boss 59d is provided on the same Z axis on upper and lower portions of the front side of the barrel 59. The pair of upper connection boss 59c and lower connection boss 59d is used for connection with the link mechanism 55.

The first reflective member 60 deflects the first optical axis 64a of the left objective optical system 35L through reflection, and thereby forms a second optical axis 64b which is at a right angle with respect to the first optical axis 64a. The second optical axis 64b is parallel to the Z axis direction. The second reflective member 62 deflects the second optical axis 64b through reflection, and thereby forms a third optical axis 64c which is parallel to the first optical axis 64a. The first optical axis 64a and the third optical axis 64c are parallel to the Y axis direction.

Each rotation pin 61a of the holding plate 61 is on a second rotational axis 12 that passes through an intersection between the second optical axis 64b and a reflective surface of the second reflective member 62 and is perpendicular to a plane formed by the first optical axis 64a and the second optical axis 64b. Consequently, by rotating the second reflective member 62 around the rotation pins 61a, a deflection direction of the third optical axis 64c is changed. As a result, it is possible to correct image blurring in the pitch direction.

The bearing bosses 59b of the barrel 59 are concentrically provided with the second optical axis 64b such that center axes thereof match each other, and function as the first rotational axis 11. Accordingly, by integrally rotating the first reflective member 60 and the second reflective member 62 around the bearing bosses 59b, the deflection direction of the third optical axis 64c is changed. As a result, it is possible to correct image blurring in the yaw direction. The first rotational axis 11 is on a plane including the first optical axis 64a and the third optical axis 64c, and crosses the first optical axis 64a or the third optical axis 64c.

In addition, the right anti-vibration unit 54R has the same configuration as the left anti-vibration unit 54L, and is supported by the casing main body 50 so as to be rotatable around the Z axis in a manner similar to that of the left anti-vibration unit 54L. Further, the right anti-vibration unit 54R is connected to the link mechanism 55, with the same structure as the left anti-vibration unit 54L. Accordingly, a detailed description of the right anti-vibration unit 54R will be omitted.

Figure 6:
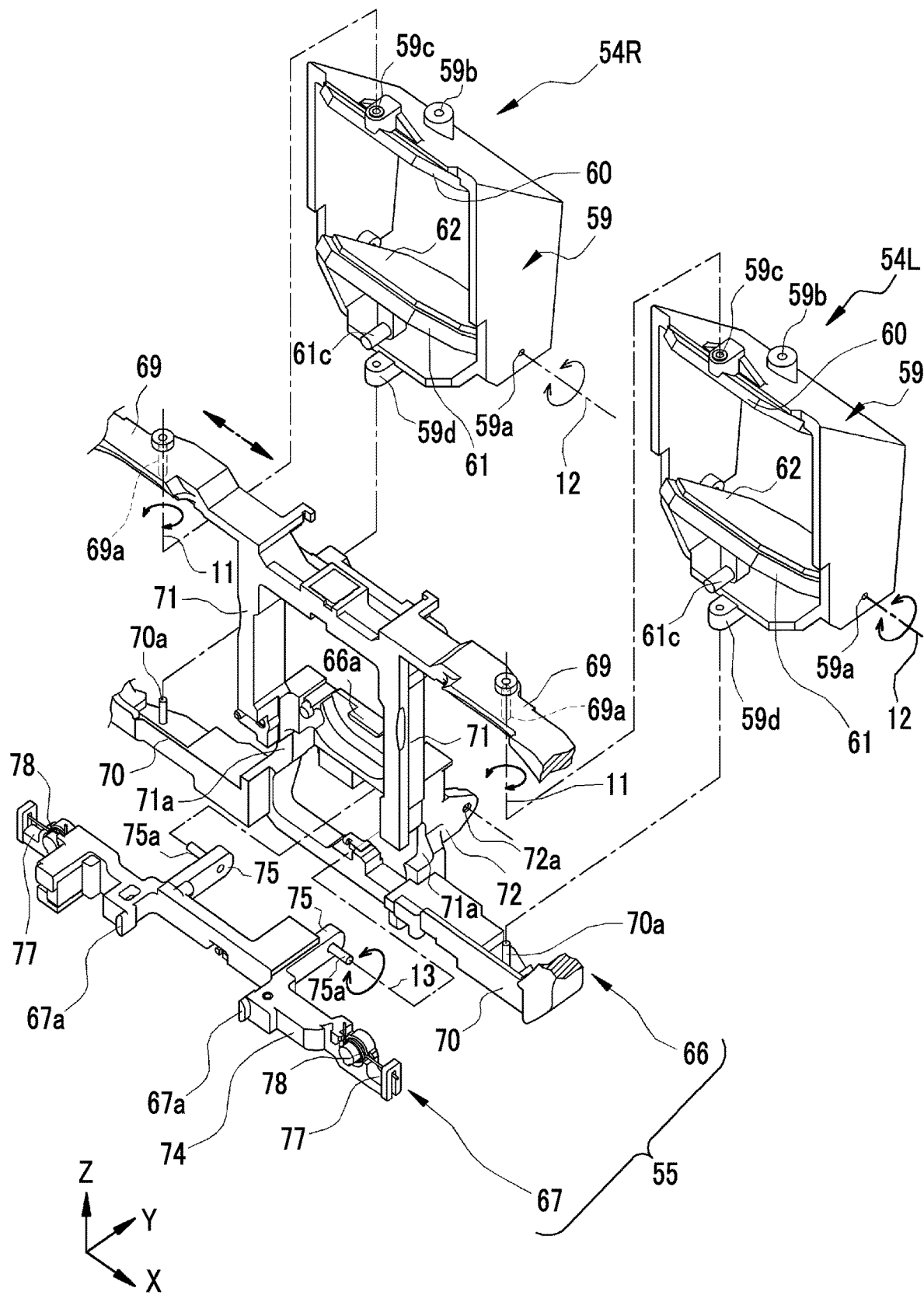
FIG. 6 is an exploded perspective view of a link mechanism.

As shown in FIG. 6, the link mechanism 55 comprises a first link member 66 and a second link member 67. The first link member 66 links the barrels 59 of the left anti-vibration unit 54L and the right anti-vibration unit 54R with each other. The pair of left and right barrels 59 linked by the first link member 66 is disposed in a state in which the first optical axes 64a are held in parallel with each other.

The pair of left and right barrels 59 is linked by the first link member 66, and thus, a barrel top plate having the bearing boss 59b and the upper connection boss 59c of the barrel 59 and a barrel lower plate having the bearing boss 59b and the lower connection boss 59d of the barrel 59 function as intermediate links. A four-joint link portion that horizontally moves the first link member 66 in the X axis direction is constituted by the intermediate links.

The second link member 67 links the pair of left and right second reflective members 62 held by the left anti-vibration unit 54L and the right anti-vibration unit 54R with each other. The second link member 67 is rotatably supported by the first link member 66.

The first link member 66 comprises first brackets 69, second brackets 70, and a pair of connecting portions 71. A pair of left and right connecting pins 69a, which is inserted into the upper connection bosses 59c of the barrels 59, is provided on lower surfaces of the first brackets 69. A pair of connecting pins 70a, which is inserted into the lower connection bosses 59d of the barrels 59, on the left and right sides is provided on upper surfaces of the second brackets 70. The pair of connecting portions 71 is vertically disposed such that the first brackets 69 and the second brackets 70 are integrally formed.

A pair of left and right third brackets 72 (see FIGS. 8 and 9) is provided on the pair of connecting portions 71 between the barrels 59. The third brackets 72 protrude toward the ocular optical systems 36L and 36R in the Y axis direction. Connection holes 72a are respectively formed in the third brackets 72 on the same X axis. Further, notches 71a are respectively provided in the pair of connecting portions 71 on a side opposite to a side on which the third brackets 72 are provided. The second link member 67 is accommodated within the notches 71a.

The second link member 67 comprises a stick-like link main body 74 and a pair of left and right connecting arms 75. The link main body 74 is provided along the X axis direction. The pair of left and right connecting arms 75 is provided on the link main body 74 between the barrels 59. The connecting arms 75 protrude toward the ocular optical systems 36L and 36R in the Y axis direction. The connecting arms 75 are provided inside the third brackets 72 near the third brackets 72.

Connecting pins 75a are provided on side surfaces of the connecting arms 75. The connecting pins 75a are inserted into the connection holes 72a formed in the third brackets 72 of the first link member 66. The connecting pins 75a supported by the connection holes 72a constitute a third rotational axis 13 (see FIG. 13). The second link member 67 links the third brackets 72 with the connecting arms 75 by using the third rotational axis 13, and is supported by the first link member 66 so as to be rotatable around the third rotational axis 13.

Figure 7:
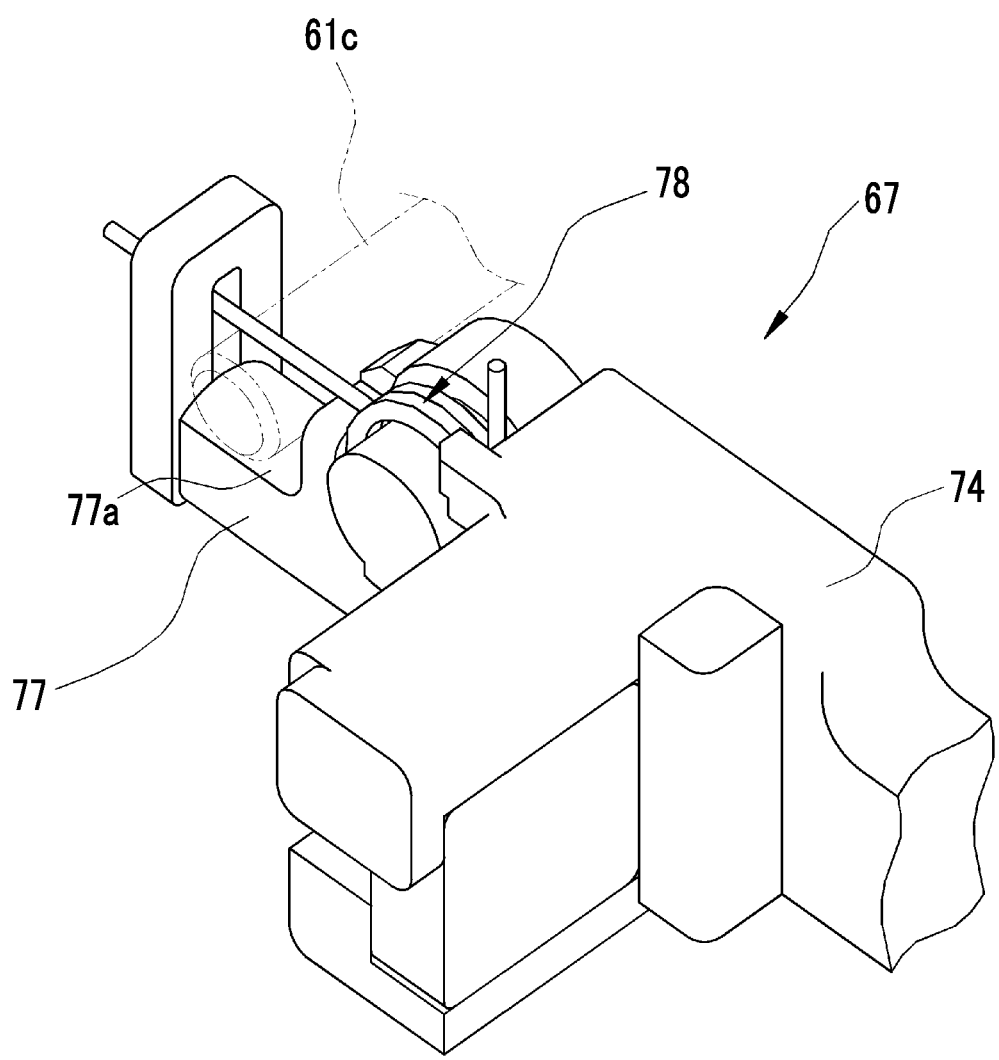
FIG. 7 is a perspective view illustrating a shape of an end portion of a second link member.

Abutment portions 77 are respectively formed on both ends of the link main body 74. The abutment portions 77 abut onto the connecting pins 61c of the holding plate 61. As shown in FIG. 7, an abutment surface 77a of the abutment portion 77 is formed as a circumferential surface. The abutment surface 77a and the connecting pin 61c are in contact with each other by the circumferential surface, and thus, the abutment portion 77 and the connecting pin 61c are in contact with each other through point contact even though the second link member 67 is rotated. Accordingly, a distance between the centers thereof is not changed. Therefore, the rotation of the second link member can be smoothly transferred to the connecting pins.

A pair of urging members 78 is attached to both ends of the link main body 74. The urging members 78 urge the connecting pins 61c of the holding plates 61 such that the connecting pins abut on the abutment portions 77. As the urging members 78, for example, leaf springs or torsion springs made of metal are used. The urging members 78 urge the connecting pins 61c, and thus, the abutment portions 77 abut on the connecting pins 61c. As a result, the link main body 74 engages with the pair of left and right second reflective members 62 through the holding plates 61.

Figure 8:
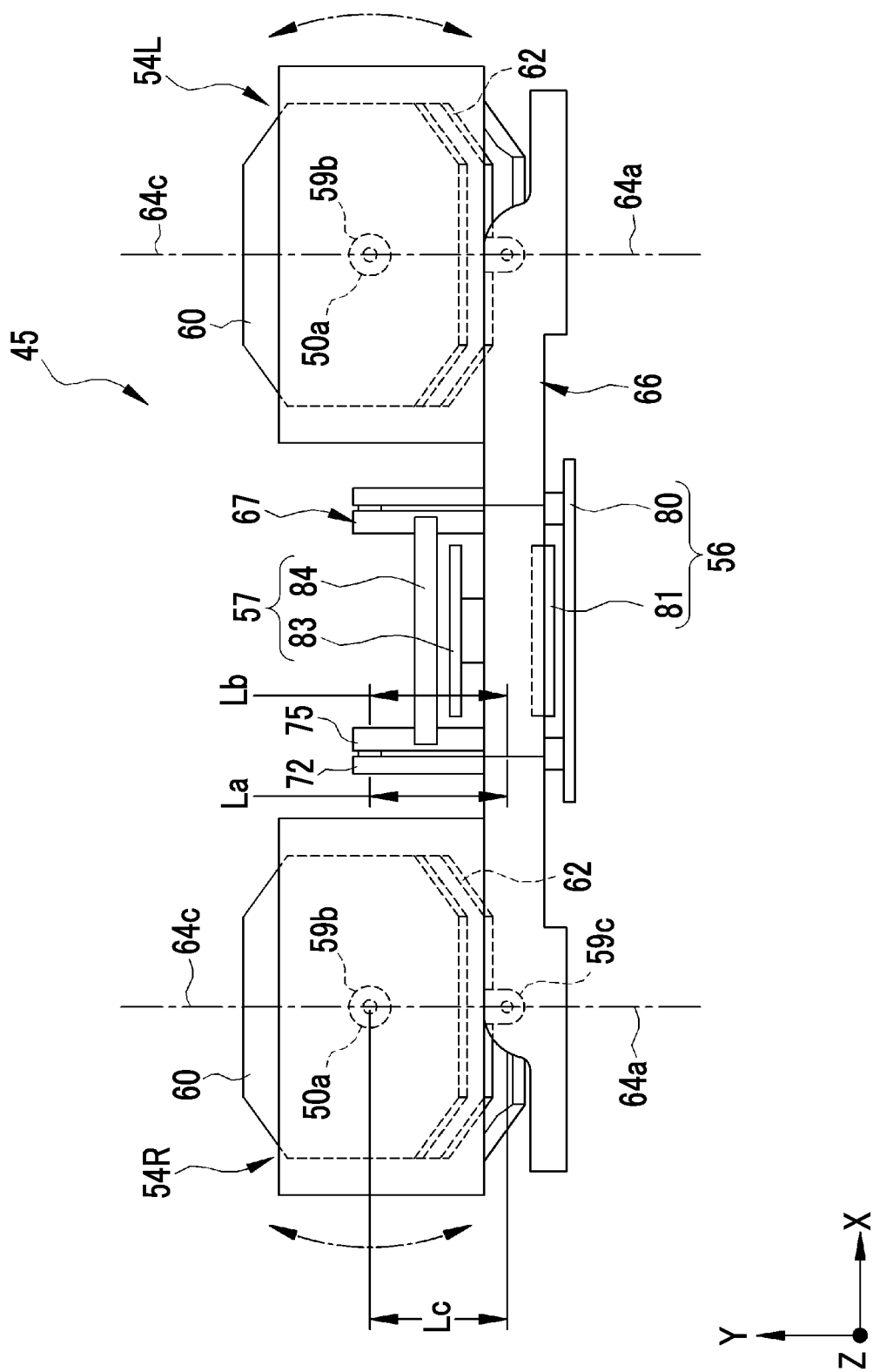
FIG. 8 is a plan view of the anti-vibration device.
Figure 9:
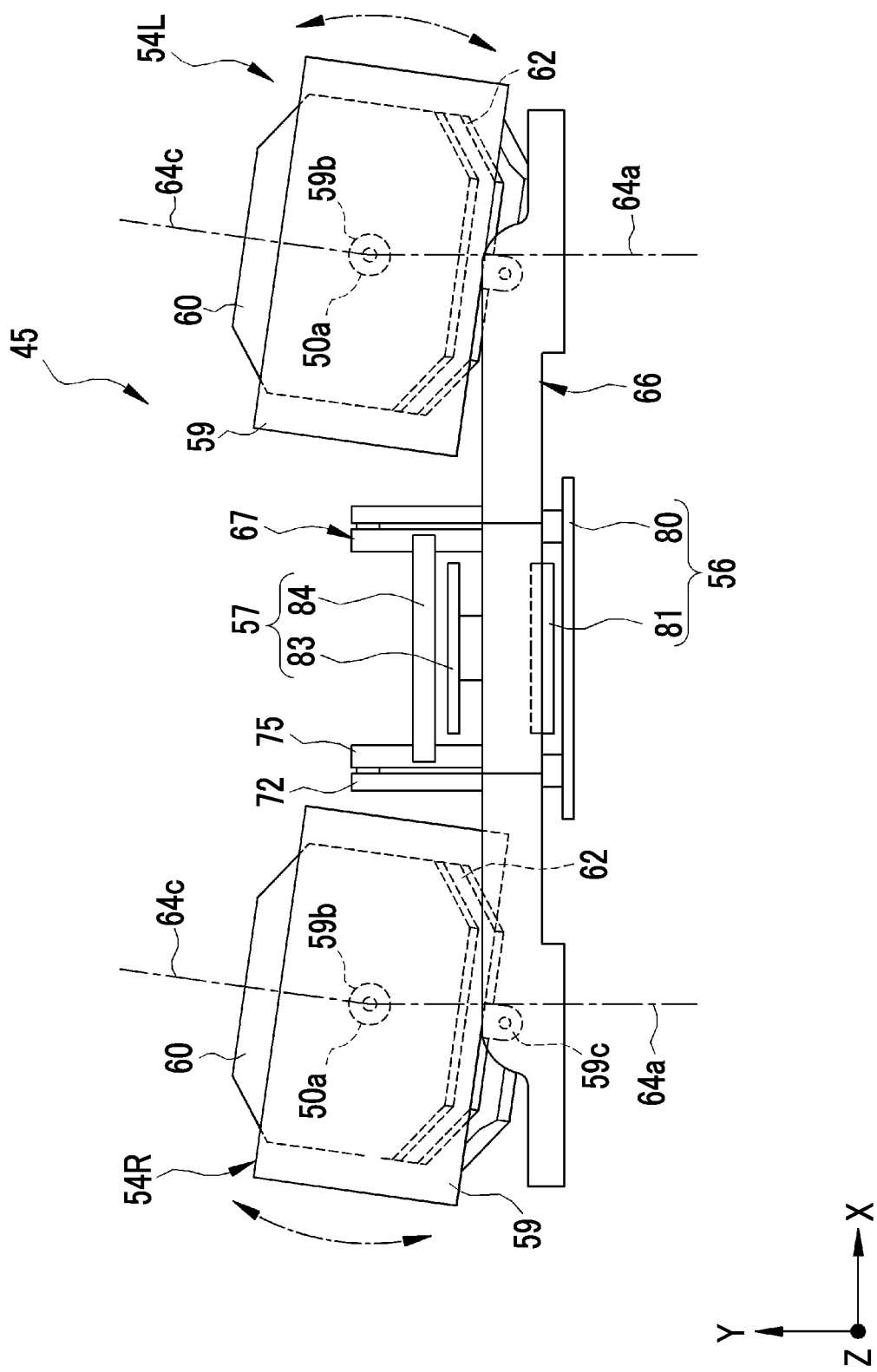
FIG. 9 is a plan view of the anti-vibration device at the time of blur correction.

As shown in FIGS. 8 and 9, the link mechanism 55 rotates the barrels 59 of the left anti-vibration unit 54L and the right anti-vibration unit 54R around the first rotational axis 11 parallel to the Z axis with the bearing bosses 59b as the centers by moving the first link member 66 along the X axis direction, that is, by moving the first link member in an arrangement direction of the barrels 59 of the left anti-vibration unit 54L and the right anti-vibration unit 54R. Thereby, the first reflective member 60 and the second reflective member 62 of the left anti-vibration unit 54L and the right anti-vibration unit 54R are respectively integrally rotated, and therefore a deflection direction of the third optical axis 64c is changed. As a result, image blurring in the yaw direction is corrected.

Figure 10:
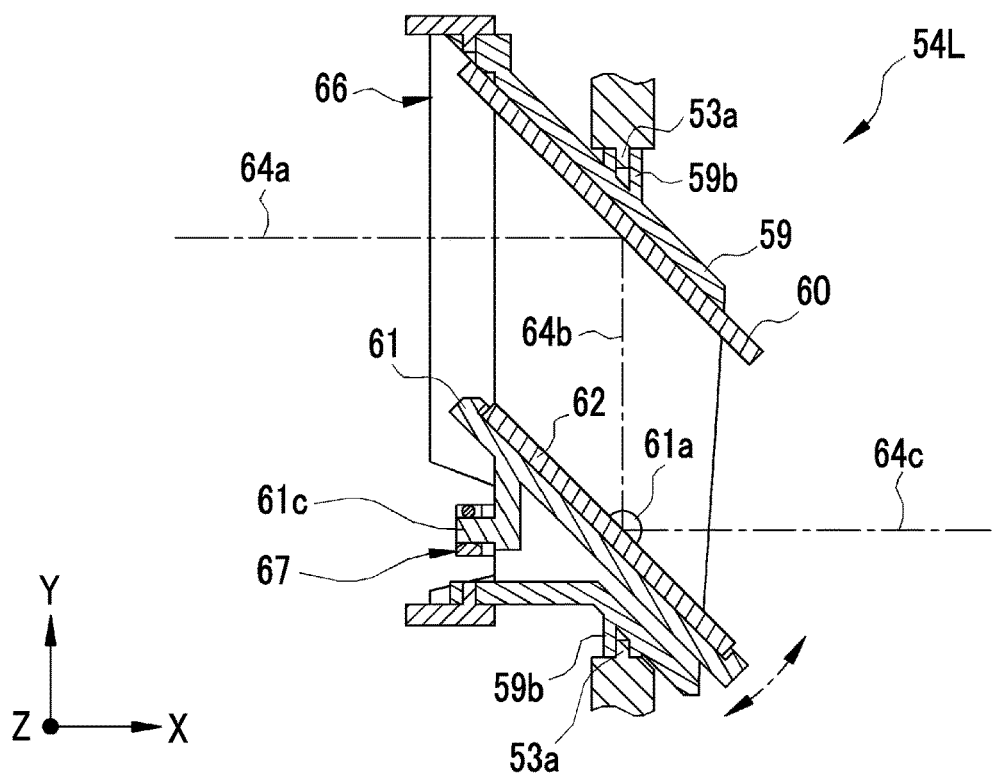
FIG. 10 is a vertical cross section view taken along a left-eye optical axis of the anti-vibration device.
Figure 11:
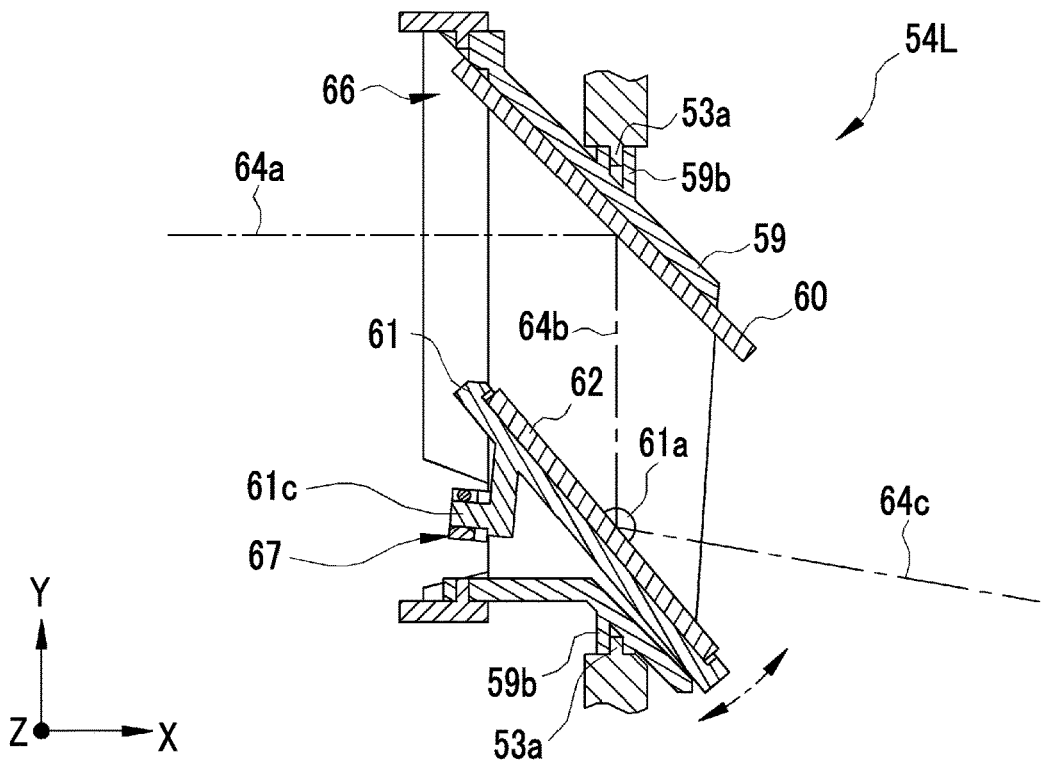
FIG. 11 is a vertical cross section view taken along the left-eye optical axis of the anti-vibration device at the time of blur correction.

Further, as shown in FIGS. 10 and 11, in a case where the second link member 67 was rotated around the connecting pins 75a (third rotational axis 13), the second reflective members 62 of the left anti-vibration unit 54L and the right anti-vibration unit 54R are respectively rotated. Therefore, the deflection direction of the third optical axis 64c is changed, and thus, image blurring in the pitch direction is corrected.

As shown in FIGS. 6 and 8, it should be noted that a length (a length from the connecting pin 69a to the connection hole 72a) La of the third bracket 72 of the first link member 66 in the Y axis direction, a length (a length from the center of the link main body 74 to the connecting pin 75a) Lb of the connecting arm 75 of the second link member 67 in the same direction, and a length Lc from the upper connection boss 59c of the barrel 59 to the bearing boss 59b are equal to each other. Accordingly, the second rotational axis 12 and the third rotational axis 13 are concentrically disposed with each other such that central lines thereof match each other. With such a configuration, the length Lc, which is a radius of rotation in a case where the anti-vibration units 54 are rotated by the first link member 66, and the lengths Lb and Lc, which are radii of rotations in a case where the first reflective members 60 are rotated by the second link member 67, are equal to each other. Therefore, in a state where the anti-vibration units 54 are rotated and inclined, rotation of the second link member 67 is possible.

The first voice coil motor 56 and the second voice coil motor 57 constitute a drive unit 58 of the present embodiment first together with a detection magnet 88 and a Z-axis position sensor 89 to be described below. As shown in FIG. 2, the first voice coil motor 56 and the second voice coil motor 57 are positioned in a middle region between the left telephoto optical system 37L and the right telephoto optical system 37R. The middle region between the left telephoto optical system 37L and the right telephoto optical system 37R is a region which is interposed between the left telephoto optical system 37L and the right telephoto optical system 37R in the X axis direction and is positioned between the front ends of the left objective optical system 35L and the right objective optical system 35R and the rear ends of the left ocular optical system 36L and the right ocular optical system 36R in the Y axis direction.

Figure 12:
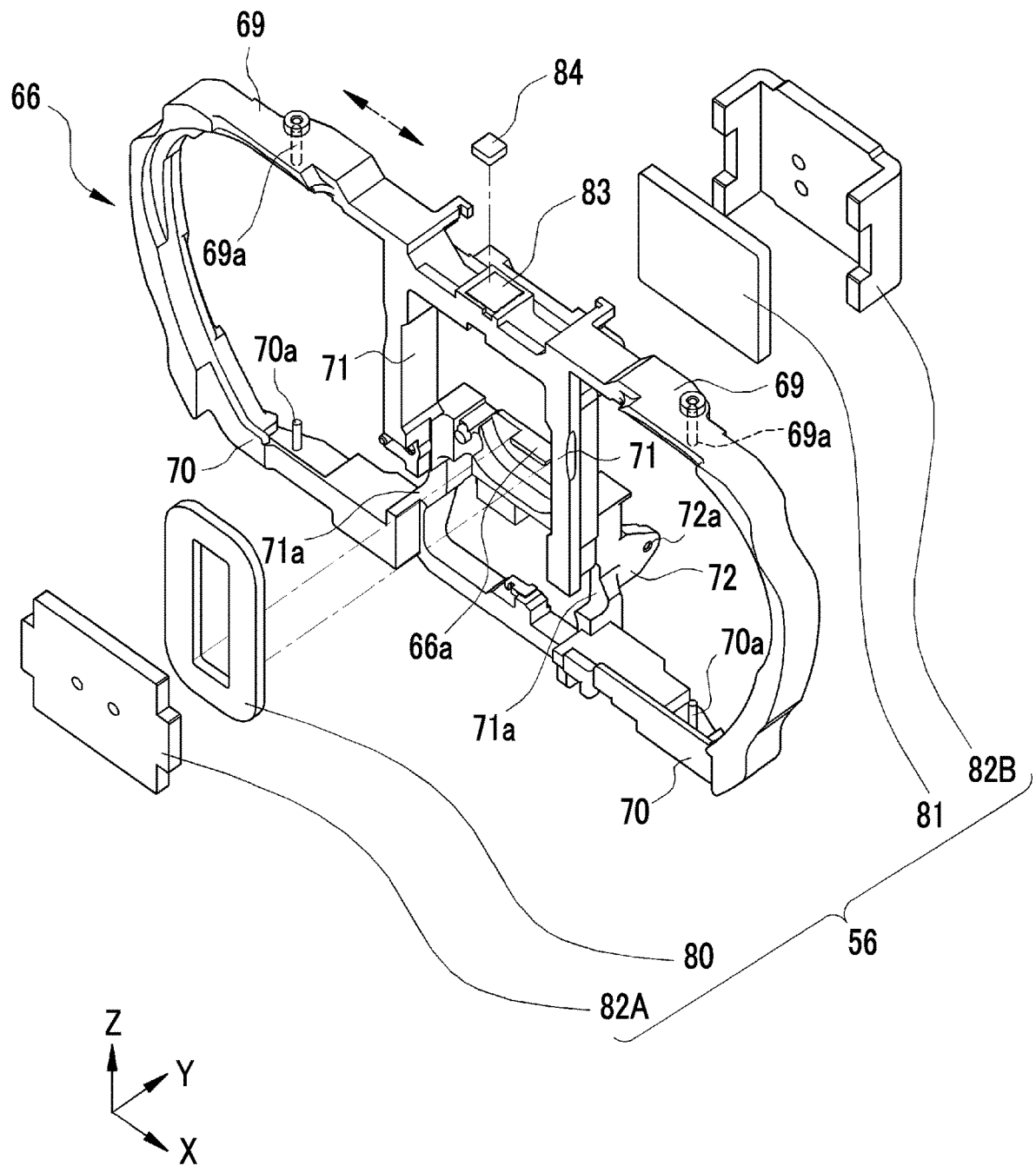
FIG. 12 is a perspective view of a first voice coil motor and an X-axis position sensor.

As shown in FIG. 12, the first voice coil motor 56 includes a first coil 80, a first driving magnet 81, and yokes 82A and 82B. The first coil 80 is obtained by winding a copper wire, and is a cylindrical air-core coil having a substantially rectangular cross section. The first coil is attached to an attachment portion 66a of the first link member 66.

The yokes 82A and 82B are made of a metal plate, and are disposed so as to pinch the first coil 80 and the first driving magnet 81. The yokes guide magnetism of the first driving magnet 81 to the first coil 80. The yoke 82B is formed in a U-shaped cross section that covers a rear surface and both side surfaces of the first driving magnet 81, and is fixed to the casing main body 50. The yoke 82B attracts the first driving magnet 81 through the magnetism of the first driving magnet 81. The yoke 82A is fixed integrally with the yoke 82B, and covers a front side of the first driving magnet 81. The first coil 80 is disposed between the yoke 82A and the first driving magnet 81, and is movable within a magnetic field generated by the first driving magnet 81.

The first voice coil motor 56 is a so-called flat-coil-type voice coil motor, and drives the first link member 66 by applying current to the first coil 80 and moving the first coil 80 in the X axis direction in magnetic field of the first driving magnet 81. The first voice coil motor 56 is driven, and thus, the first link member 66 moves along the X axis direction.

A detection magnet 83 is buried in an upper surface of the first bracket 69. An X-axis position sensor 84 is provided on an upper surface of an inner wall of the casing main body 50. The X-axis position sensor 84 is disposed so as to face the detection magnet 83, and measures a movement amount of the first link member 66 including the first coil 80 in the X axis direction. The X-axis position sensor 84 is, for example, a magnetic sensor such as a Hall element, detects magnetic field of the detection magnet 83, and outputs a detection signal according to an intensity of the magnetism.

Figure 13:
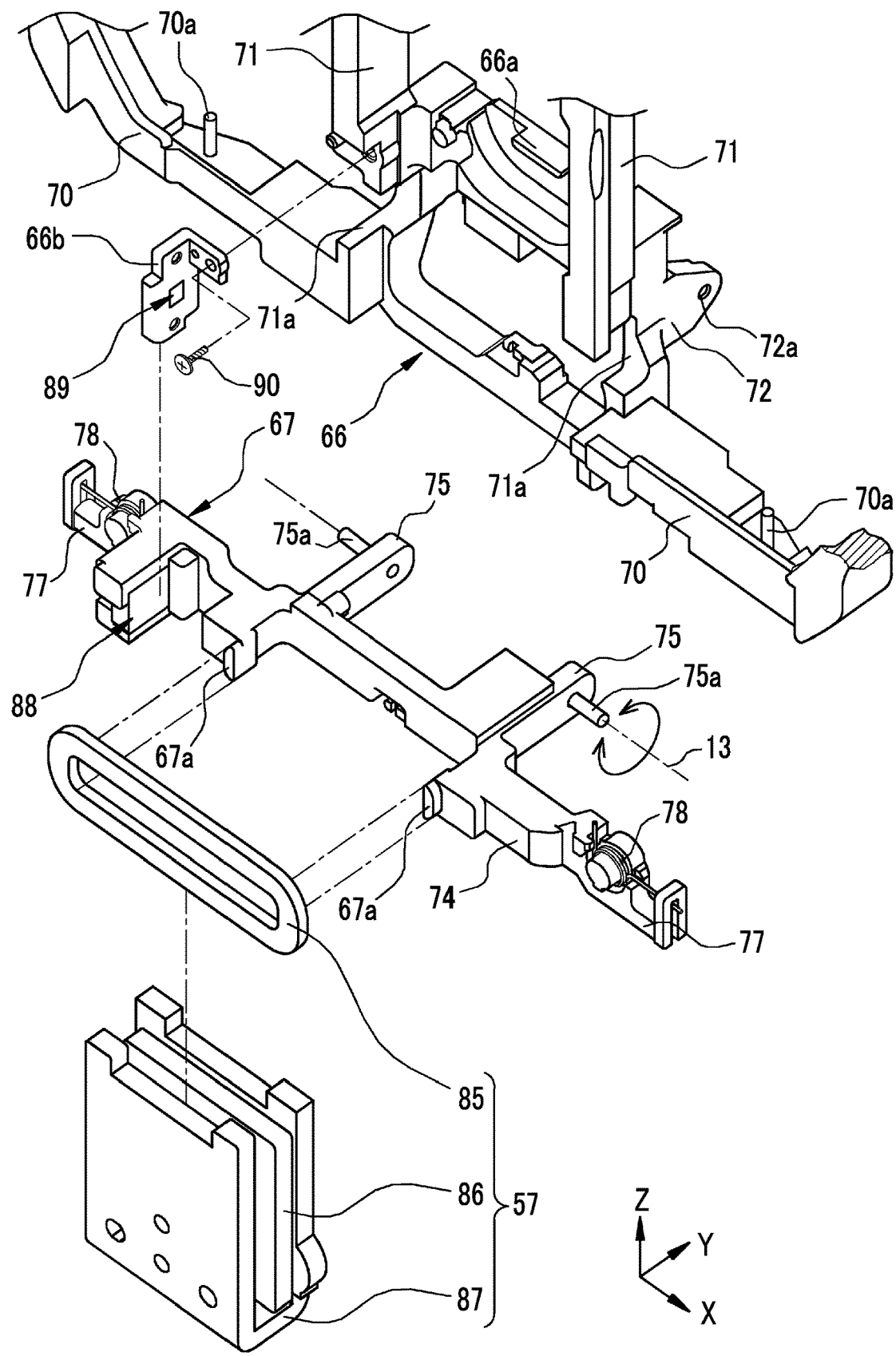
FIG. 13 is a perspective view of a second voice coil motor and a Z-axis position sensor.

As shown in FIG. 13, the second voice coil motor 57 includes a second coil 85, a second driving magnet 86, and a yoke 87. Similarly to the first coil 80, the second coil 85 is made of a copper line, and is a cylindrical air-core having a substantially rectangular cross section. The second coil is attached to a pair of attachment portions 67a of the second link member 67.

The link main body 74 has a notch 74a in the center. The second driving magnet 86 is disposed within the notch 74a. The pair of attachment portions 67a is formed so as to protrude forwards from the notch 74a. Thus, the second driving magnet 86 is disposed on the rear side of the second coil 85. The yoke 87 is made of a metal plate, and is disposed so as to pinch the second coil 85 and the second driving magnet 86. The yoke guides magnetism of the second driving magnet 86 to the second coil 85. The yoke 87 is formed in a U-shaped cross section that covers a front surface and a rear surface of the second driving magnet 86, and is fixed to the yoke 82A of the first voice coil motor 56 through a connection member (not shown). The yoke 87 attracts the second driving magnet 86 through the magnetism of the second driving magnet 86. The second coil 85 is disposed between the yoke 87 and the second driving magnet 86, and is movable within a magnetic field generated by the second driving magnet 86.

The second voice coil motor 57 is a voice coil motor which is the same as the first voice coil motor 56, and drives the second link member 67 by applying current to the second coil 85 and moving the second coil 85 in the Z axis direction in magnetic field of the second driving magnet 86. The second voice coil motor 57 is driven, and thus, the second link member 67 is rotated around the third rotational axis 13.

A holding portion 74b is formed at the link main body 74. The detection magnet 88 is buried in the holding portion 74b. That is, the detection magnet 88 is attached to the second link member 67, and moves integrally with the second link member 67. The detection magnet 88 corresponds to a position detection magnet of the present invention. The holding portion 74b is disposed on a side on which the right anti-vibration unit 54R is positioned with respect to the notch 74a. The Z-axis position sensor 89 is provided at the first link member 66 through a holding piece 66b. The Z-axis position sensor 89 is disposed such that a detection surface 89a (see FIG. 15, and FIGS. 16A to 16D) faces the detection magnet 88, and measures a movement amount of the second link member 67 including the second coil 85 in the Z axis direction. The Z-axis position sensor 89 is the same magnetic sensor as the X-axis position sensor 84, detects magnetic field of the detection magnet 88, and outputs a detection signal according to an intensity of the magnetism.

The holding piece 66b has a rectangular frame shape that covers a surrounding area of the Z-axis position sensor 89. For example, the holding piece 66b is fastened to the first link member 66 through a coupling screw 90, and holds the Z-axis position sensor 89 so as to be spaced from the second coil 85 in the X axis direction and is pinched between the attachment portion 67a and the holding portion 74b. Accordingly, the detection magnet 88 is disposed on a side opposite to the second coil 85 with respect to the Z-axis position sensor 89 in the X axis direction, that is, on a side on which the right anti-vibration unit 54R is positioned.

The holding piece 66b has rigidity, and holds the Z-axis position sensor 89 with a predetermined distance D (see FIGS. 16A to 16D) from the detection magnet 88 in the X axis direction. For example, in a case where a movement stroke (a maximum value of a displacement amount) of the detection magnet 88 in the X axis direction is HMAX (see FIG. 16A), it is preferable that the predetermined distance D is 50% to 200% of the movement stroke HMAX.

Figure 14:
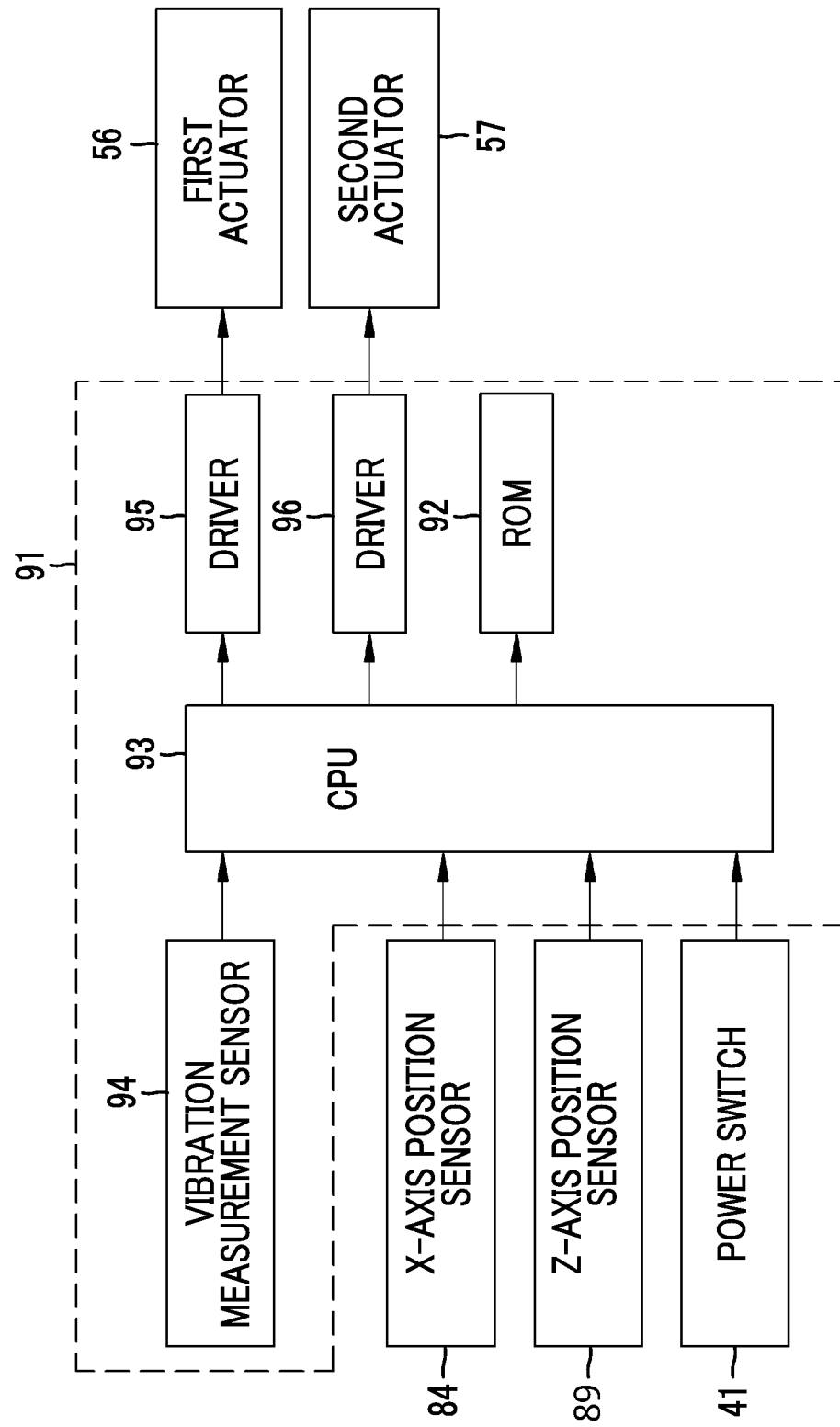
FIG. 14 is a block diagram of an anti-vibration control circuit.

As shown in FIG. 14, an anti-vibration control circuit 91 provided on the control substrate 46 includes a read only memory (ROM) 92, a central processing unit (CPU) 93, an vibration measurement sensor 94, and drivers 95 and 96. The ROM 92 stores a control program. The CPU 93 controls the anti-vibration device 45 on the basis of the control program. The vibration measurement sensor 94 measures amounts of vibration of the binocle 30 around the X and Z axes. The drivers 95 and 96 drive the first voice coil motor 56 and the second voice coil motor 57, respectively. The CPU 93 is connected to the power switch 41, the X-axis position sensor 84, and the Z-axis position sensor 89.

Figure 15:
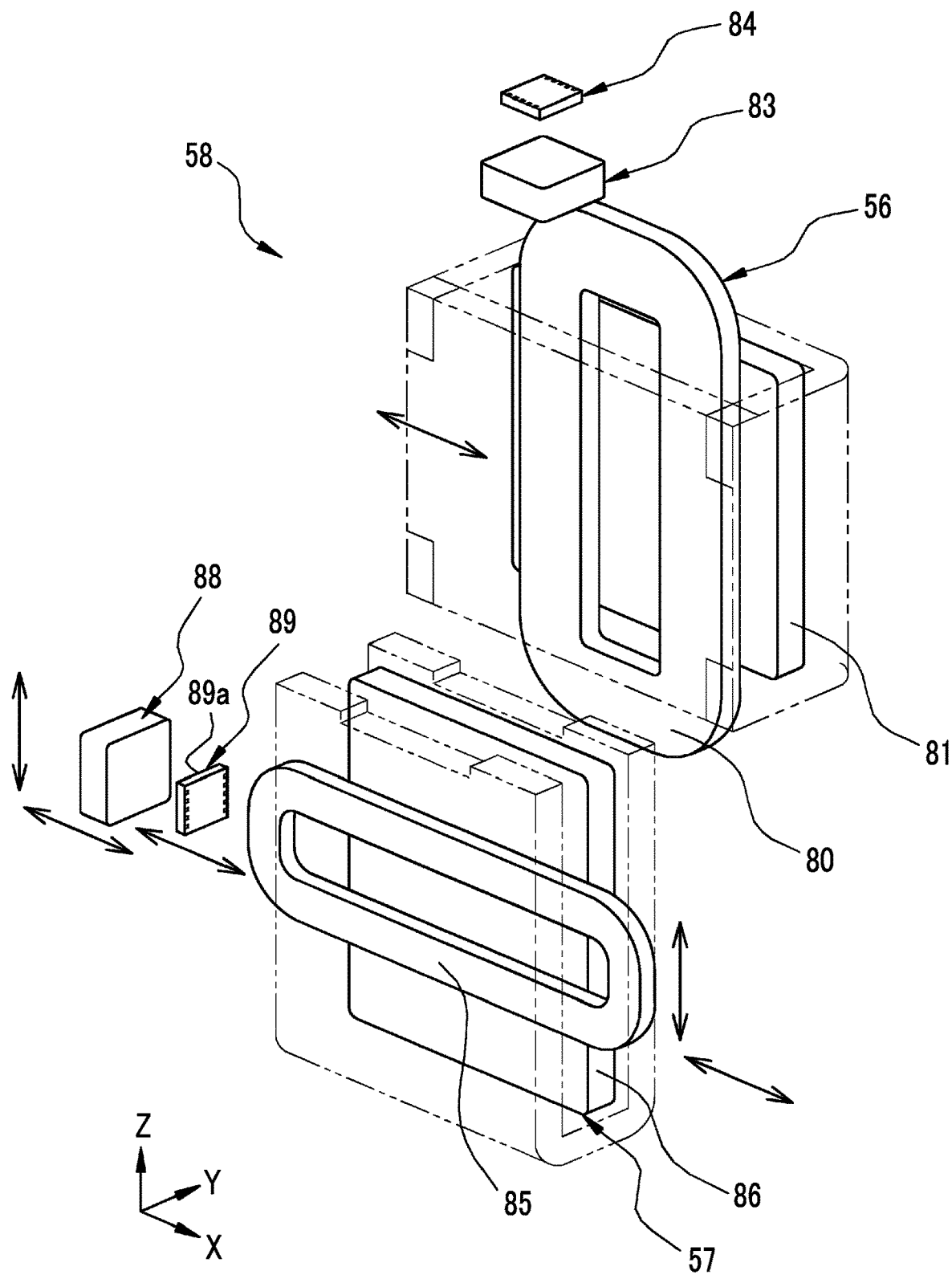
FIG. 15 is a perspective view illustrating a configuration of a drive unit.

As shown in FIG. 15, the anti-vibration device 45 corrects the image blurring of the optical image by driving the drive unit 58 constituted by the first voice coil motor 56, the second voice coil motor 57, the detection magnet 88, and the Z-axis position sensor 89. As described above, since the second coil 85 and the detection magnet 88 are attached to the first link member 66 through the second link member 67 and the first coil 80 and the Z-axis position sensor 89 are fixedly attached to the first link member 66, in a case where the first coil 80 enters an energized state, the first coil 80, the second coil 85, the detection magnet 88, and the Z-axis position sensor 89 move in the X axis direction. Meanwhile, in a case where the second coil 85 enters an energized state, the second coil 85 and the detection magnet 88 move in the Z axis direction, but the first coil 80 and the Z-axis position sensor 89 do not move in the Z axis direction.

Since the detection magnet 83 is fixedly attached to the first link member 66, in a case where the first coil 80 enters the energized state, the detection magnet 83 moves integrally with the first coil 80 in the X axis direction. Meanwhile, in a case where the second coil 85 enters the energized state, the detection magnet 83 does not move in the Z axis direction. Since the X-axis position sensor 84 is attached to the casing main body 50, even in a case where any of the first coil 80 and the second coil 85 enters the energized state, the X-axis position sensor does not move in the X axis direction and the Y axis direction.

Figure 16A:
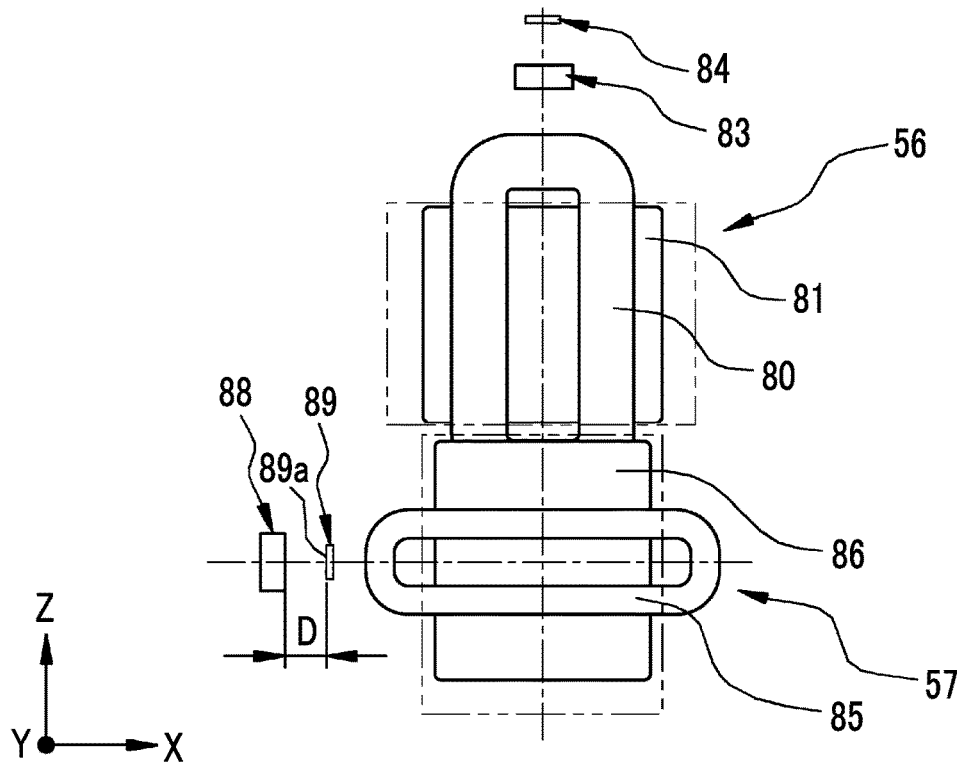
FIG. 16A is an explanatory diagram showing the drive unit in a neutral state.
Figure 16B:
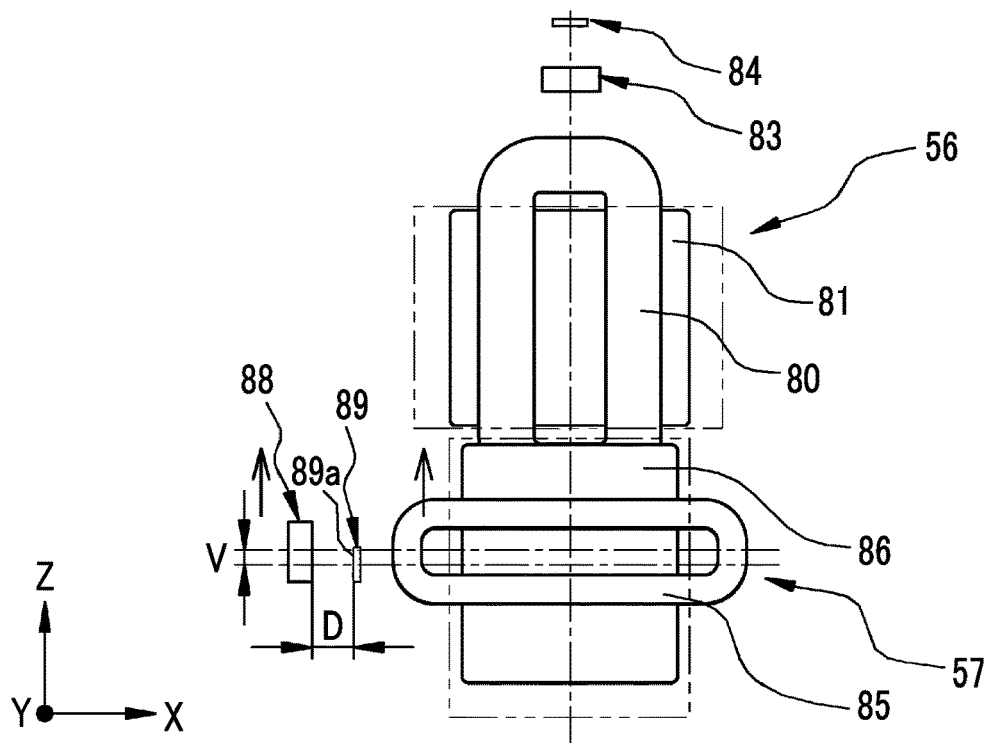
FIG. 16B is an explanatory diagram showing the drive unit in a state in which a first coil enters a deenergized state and a second coil enters an energized state.

As shown in FIG. 16A, in a case where the anti-vibration device 45 enters a neutral state, the second coil 85, the detection magnet 88, and the Z-axis position sensor 89 are disposed in the same position in the Z axis direction. As shown in FIG. 16B, in a case where the second coil 85 enters the energized state and the first coil 80 enters a deenergized state, since the detection magnet 88 moves integrally with the second coil 85 in the Z axis direction, the magnetism detected by the Z-axis position sensor 89 is changed. That is, the Z-axis position sensor 89 can detect a displacement amount V of the detection magnet 88 in the Z axis direction.

Figure 16C:
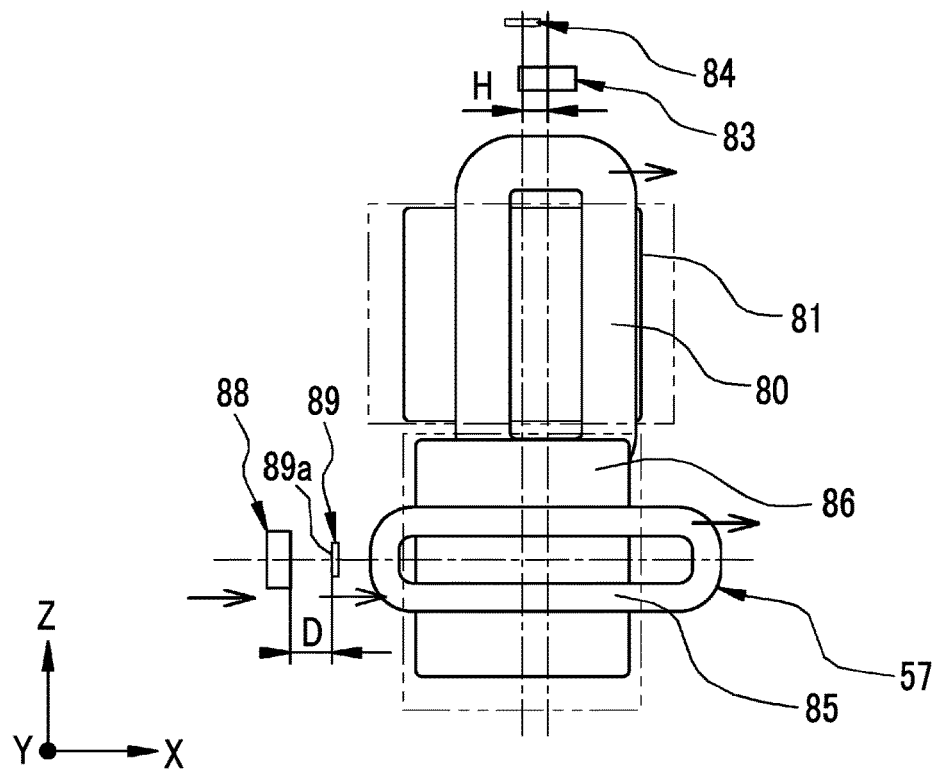
FIG. 16C is an explanatory diagram showing the drive unit in a state in which the first coil enters an energized state and the second coil enters a deenergized state.

As shown in FIG. 16C, in a case where the first coil 80 enters the energized state and the second coil 85 enters the deenergized state, the first coil 80, the second coil 85, the detection magnet 88, and the Z-axis position sensor 89 move in the X axis direction. In this case, the second coil 85 and the detection magnet 88 do not move in the Z axis direction. Since the detection magnet 88 and the Z-axis position sensor 89 move while maintaining a predetermined distance D in the X axis direction and the detection magnet 88 does not move in the Z axis direction, the magnetism detected by the Z-axis position sensor 89 is not changed. That is, the displacement amount of the detection magnet 88 in the Z axis direction is not detected (displacement amount is 0). Since the detection magnet 83 moves integrally with the first coil 80 in the X axis direction, a displacement amount H of the detection magnet 83 in the X axis direction is able to be detected.

Figure 16D:
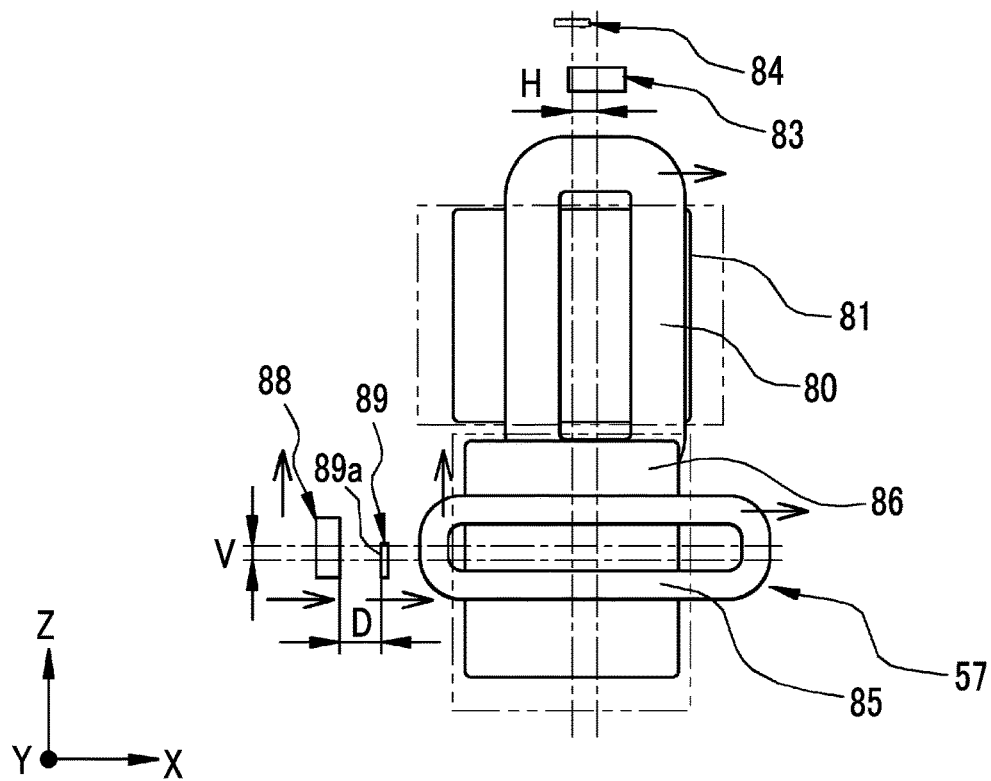
FIG. 16D is an explanatory diagram showing the drive unit in a state in which the first coil and the second coil enter the energized state.

As shown in FIG. 16D, in a case where the first coil 80 and the second coil 85 enter the energized state, the detection magnet 88 moves integrally with the second coil 85 in the Z axis direction while the first coil 80, the second coil 85, the detection magnet 88, and the Z-axis position sensor 89 move in the X axis direction. Thus, the magnetism detected by the Z-axis position sensor 89 is changed. That is, the Z-axis position sensor 89 can detect the displacement amount of the detection magnet 88 in the Z axis direction while moving integrally with the first coil 80 in the X axis direction. Since the detection magnet 83 moves integrally with the first coil 80 in the X axis direction, the X-axis position sensor 84 can detect the displacement amount H of the detection magnet 83 in the X axis direction.

Next, effects of the above-mentioned embodiment will be described. The anti-vibration control circuit 91 starts actuation through an ON operation of the power switch 41. The vibration measurement sensor 94 detects vibration of the binocle 30 around the X and Z axes, and outputs the detection signal to the CPU 93. The CPU 93 controls the drivers 95 and 96 on the basis of the detection signal of the vibration measurement sensor 94 and the position information of the first coil 80 and the second coil 85 detected by the X-axis position sensor 84 and the Z-axis position sensor 89, and drives the first voice coil motor 56 and the second voice coil motor 57 so as to correct image blurring of an optical image.

In a case where image blurring in the pitch direction occurs in the binocle 30, the CPU 93 moves the second coil 85 of the second voice coil motor 57 in the Z axis direction. The second link member 67 is rotated around the connecting pins 75a of the connecting arms 75 due to the movement of the second coil 85. The second reflective members 62 of the left anti-vibration unit 54L and the right anti-vibration unit 54R are rotated around the X axis with the rotation pins 61a as the centers due to the rotation. Thereby, the deflection direction of the third optical axis 64c is changed, and thus image blurring in the pitch direction is corrected.

Further, in a case where image blurring in the yaw direction occurs in the binocle 30, the CPU 93 moves the first coil 80 of the first voice coil motor 56 in the X axis direction. The first link member 66 moves in the X axis direction due to the movement of the first coil 80. The respective barrels 59 of the left anti-vibration unit 54L and the right anti-vibration unit 54R is rotated around the Z axis with the bearing bosses 59b as the centers due to the movement. Accordingly, since the first reflective members 60 and the second reflective members 62 of the left anti-vibration unit 54L and the right anti-vibration unit 54R are integrally rotated and the deflection direction of the third optical axis 64c is changed, image blurring in the yaw direction is corrected.

In a case where image blurring in the pitch direction and the yaw direction occurs in the binocle 30, the CPU 93 drives the first voice coil motor 56 and the second voice coil motor 57. Accordingly, the first reflective members 60 and the second reflective members 62 of the left anti-vibration unit 54L and the right anti-vibration unit 54R are integrally rotated around the Z axis while rotating the second reflective members 62 of the left anti-vibration unit 54L and the right anti-vibration unit 54R around the X axis. Even in such a case where mixed image blurring is corrected, the first reflective member 60 and the second reflective member 62 are integrally rotated. Therefore, an optical image is prevented from rotating around the optical axis.

According to the drive unit 58 of the present embodiment, since the Z-axis position sensor 89 is disposed so as to be spaced from the second coil 85 in the X axis direction and the detection magnet 88 is disposed on a side opposite to the second driving magnet 86 with respect to the Z-axis position sensor 89 in the X axis direction, the Z-axis position sensor 89 can accurately perform position detection without being influenced by the magnetism of the second driving magnet 86.

Since the Z-axis position sensor 89 is held with the predetermined distance D from the detection magnet 88 in the X axis direction in the drive unit 58, it is possible to detect only a change in magnetism of the detection magnet 88 in the Z axis direction, and thus, position detection accuracy is improved.

Although it has been described in the embodiment that the first reflective member is inclined at an angle of 45° with respect to the first optical axis of the objective optical system, and the second optical axis is deflected at an angle of 90° with respect to the first optical axis, an angle formed by the first optical axis and the second optical axis may be smaller or greater than 90°. Further, in a case where the first reflective member and the second reflective member are integrally rotated, the second optical axis is used as a rotational axis thereof, but is not limited to this. For example, the second optical axis may be freely selected in a case where the axis is an axis that passes through the intersection between the first optical axis and the reflective surface of the first reflective member and is included in a plane formed by the first optical axis and the second optical axis.

Although it has been described in the embodiment that the first reflective members 60 are fixed to the barrels 59 and the second reflective member 62 is fixed to and held by the holding plate 61 so as to be rotatable, the second reflective members 62 may be fixed to the barrels 59, and the first reflective members may be held through the holding plate so as to be rotatable.

In the above-mentioned embodiment, a surface reflection mirror was used as the reflective member, but a prism of which the rear surface is reflective may be used as the reflective member. Furthermore, in the description of each embodiment, in order to show a positional relationship between a plurality of optical axes, a certain term such as a right angle or parallelism is used as a specific numerical angle such as 45° or 90°. However, those include tolerances according to accuracies required in an optical system.

EXPLANATION OF REFERENCES

11: first rotational axis
12: second rotational axis
13: third rotational axis
30: binocle
31: main body portion
31a: front surface
32L: left objective opening
32R: right objective opening
33L: left eyepiece portion
33R: right eyepiece portion
35L: left objective optical system
35R: right objective optical system
36L: left ocular optical system
36R: right ocular optical system
37L: left telephoto optical system
37R: right telephoto optical system
39: battery housing
40: adjusting knob
41: power switch
42: battery
43: casing
44L: left objective barrel
44R: right objective barrel
45: anti-vibration device
46: control substrate
47L: left erecting optical system
47R: right erecting optical system
48L: left eyepiece barrel
48R: right eyepiece barrel
50: casing main body
51L: left eyepiece casing
51R: right eyepiece casing
52L: left eyepiece opening
52R: right eyepiece opening
53: support member
53a: bearing pin
54L: left anti-vibration unit
54R: right anti-vibration unit
55: link mechanism
56: first voice coil motor
57: second voice coil motor
58: drive unit
59: barrel
59a: bearing hole
59b: bearing boss
59c: upper connection boss
59d: lower connection boss
60: first reflective member
61: holding plate
61a: rotation pin
61b: bracket
61c: connecting pin
62: second reflective member
64a: first optical axis
64b: second optical axis
64c: third optical axis
66: first link member 66a: attachment portion
66b: holding piece
67: second link member
67a: attachment portion
69: first bracket
69a: connecting pin
70: second bracket
70a: connecting pin
71: connecting portion
71a: notch
72: third bracket
72a: connection hole
74: link main body
74a: notch
74b: holding portion
75: connecting arm
75a: connecting pin
77: abutment portion
77a: abutment surface
78 urging member
80: first coil
81: first driving magnet
82A: yoke
82B: yoke
83: detection magnet
84: X-axis position sensor
85: second coil
86: second driving magnet
87: yoke
88: detection magnet
89: Z-axis position sensor
89a: detection surface
90: coupling screw
91: anti-vibration control circuit
92: ROM
93: CPU
94: vibration measurement sensor
95: driver
96: driver

What is claimed is:

1. An anti-vibration device comprising:
a drive unit comprising:
a first voice coil motor that has a first driving magnet, and a first coil which is provided within a magnetic field generated by the first driving magnet and is driven in a first direction in a case where the first coil is energized;
a second voice coil motor that has a second driving magnet, and a second coil which is provided within a magnetic field generated by the second driving magnet and is driven in a second direction perpendicular to the first direction in a case where the second coil is energized;
a position detection magnet that moves integrally with the second coil; and
a magnetic sensor that is disposed so as to be spaced from the second coil in the first direction, and detects a displacement amount of the position detection magnet in the second direction,
wherein the position detection magnet is positioned on a side opposite to the second driving magnet with respect to the magnetic sensor in the first direction,
first reflective members that are disposed to be inclined with respect to first optical axes, and form second optical axes by deflecting the first optical axes;
second reflective members that are disposed to be inclined with respect to the second optical axes, and form third optical axes parallel to the first optical axes by deflecting the second optical axes;

holding members that each holds the first reflective member and the second reflective member, and are disposed so as to be rotatable around first rotational axes which are present on a plane including the first optical axes and the second optical axes and cross the first optical axes or the third optical axes, the holding members each fixedly holding one reflective member of the first reflective member and the second reflective member and rotatably holding the other reflective member around second rotational axes perpendicular to the plane including the first optical axes and the second optical axes; and a link mechanism that rotates a pair of the holding members disposed in a state in which the first optical axes are held in parallel with each other around the first rotational axes and rotates the other reflective member of the first reflective member and the second reflective member around the second rotational axes, wherein the link mechanism includes a first link member that has pin coupling portions which are pin-coupled to the pair of holding members, and a second link member that is attached to the first link member so as to be rotatable around a third rotational axis parallel to the second rotational axes and has abutment portions which rotate the other reflective member by engaging with the other reflective member, the first voice coil motor moves the first link member in the first direction which is an arrangement direction of the holding members, and the second voice coil motor rotates the second link member around the third rotational axis by moving the second link member in the second direction.

2. The anti-vibration device according to claim 1,
wherein the magnetic sensor is a Hall element that detects a magnetic field generated by the position detection magnet.

3. The anti-vibration device according to claim 1,
wherein the first coil is attached to the first link member, and
the second coil and the position detection magnet are attached to the second link member.

4. The anti-vibration device according to claim 3,
wherein the magnetic sensor is fixed to the first link member through a holding piece, and
the holding piece holds the magnetic sensor with a predetermined distance from the position detection magnet in the first direction.

5. The anti-vibration device according to claim 4,
wherein the predetermined distance between the position detection magnet and the magnetic sensor is 50% to 200% of a movement stroke of the position detection magnet in the first direction.

6. A binocle comprising:
objective optical systems each having a positive composite focal length;
ocular optical systems; and
the anti-vibration device according to claim 1 provided between the objective optical systems and the ocular optical systems.

7. The binocle according to claim 6,
wherein the ocular optical systems each have a positive composite focal length, and erecting optical systems that invert an optical image in vertical and horizontal directions are provided between the anti-vibration device and the ocular optical systems.

* * * * *